US012698984B2

(12) United States Patent
Yoshizumi

(10) Patent No.: US 12,698,984 B2
(45) Date of Patent: Aug. 4, 2026

(54) ROTARY SENSOR AND SENSOR SUBSTRATE

(71) Applicant: Panasonic Intellectual Property Management Co., Ltd., Osaka (JP)

(72) Inventor: Junichi Yoshizumi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 170 days.

(21) Appl. No.: 18/834,127

(22) PCT Filed: Nov. 28, 2022

(86) PCT No.: PCT/JP2022/043721
§ 371 (c)(1),
(2) Date: Jul. 29, 2024

(87) PCT Pub. No.: WO2023/149063
PCT Pub. Date: Aug. 10, 2023

(65) Prior Publication Data
US 2025/0155266 A1 May 15, 2025

(30) Foreign Application Priority Data

Feb. 4, 2022 (JP) ................................. 2022-016695

(51) Int. Cl.
*G01D 5/20* (2006.01)
*G01D 5/241* (2006.01)
(52) U.S. Cl.
CPC ............. *G01D 5/204* (2013.01); *G01D 5/241* (2013.01)
(58) Field of Classification Search
CPC ................................. G01D 5/204; G01D 5/241
See application file for complete search history.

(56) References Cited

U.S. PATENT DOCUMENTS

| | | | | |
|---|---|---|---|---|
| 3,402,333 A | * | 9/1968 | Hayner | ................. H02P 25/024 |
| | | | | 318/717 |
| 4,093,897 A | * | 6/1978 | Fujita | ........................ H02P 6/06 |
| | | | | 318/400.04 |

(Continued)

FOREIGN PATENT DOCUMENTS

| | | |
|---|---|---|
| JP | H05-322599 A | 12/1993 |
| JP | 2015-068640 A | 4/2015 |

(Continued)

OTHER PUBLICATIONS

International Search Report dated Jan. 17, 2023 issued in International Patent Application No. PCT/JP2022/043721, with English translation.

*Primary Examiner* — Paresh Patel
(74) *Attorney, Agent, or Firm* — Rimon P.C.

(57) ABSTRACT

A plurality of conductive parts are aligned along a rotational direction of a rotor. A different-thickness part relatively differs in thickness in one direction. In the rotor, a plurality of gaps are provided to separate the plurality of conductive parts from each other. An excitation coil is annularly arranged on a counter surface of a substrate. A detection coil is disposed inside the excitation coil on the counter surface of the substrate. A detection electrode part is disposed on the counter surface of the substrate such that the detection electrode part overlaps part of a rotation trajectory of the different-thickness part at a time of rotation of the rotor in plan view in the one direction, and the detection electrode part is configured to detect capacitance generated between the detection electrode part and the rotor.

19 Claims, 19 Drawing Sheets

(56)          References Cited

U.S. PATENT DOCUMENTS

| 5,736,865 | A | * | 4/1998 | Nelson | G01D 5/2415 |
| | | | | | 324/683 |
| 5,796,250 | A | * | 8/1998 | Dames | G01D 5/204 |
| | | | | | 324/207.17 |
| 10,228,233 | B2 | * | 3/2019 | Kimata | H02K 29/12 |
| 2013/0038466 | A1 | * | 2/2013 | Shen | G08C 19/00 |
| | | | | | 340/870.02 |

FOREIGN PATENT DOCUMENTS

| JP | 2015-224923 | A | 12/2015 |
| JP | 2015-227826 | A | 12/2015 |

* cited by examiner

ANGLE

ANGLE

ROTARY SENSOR AND SENSOR SUBSTRATE

CROSS-REFERENCE OF RELATED APPLICATIONS

This application is the U.S. National Phase under 35 U.S.C. § 371 of International Patent Application No. PCT/JP2022/043721, filed on Nov. 28, 2022, which in turn claims the benefit of Japanese Patent Application No. 2022-016695, filed on Feb. 4, 2022, the entire disclosures of which Applications are incorporated by reference herein.

TECHNICAL FIELD

The present disclosure generally relates to rotary sensors and sensor substrates and specifically relates to a rotary sensor configured to detect an angle of rotation of a rotary object and a sensor substrate to be applied to the rotary sensor.

BACKGROUND ART

Patent Literature 1 describes a position sensor including a sensor stator and a sensor rotor facing the sensor stator. The sensor stator includes a detection coil and an excitation coil disposed on an inner circumference of the detection coil. The sensor rotor includes two magnetic field shielding parts and two magnetic field non-shielding parts. The two magnetic field shielding parts and the two magnetic field non-shielding parts are alternately arranged along a rotational direction of the sensor rotor.

In the position sensor described in Patent Literature 1, the excitation coil generates a magnetic field, and in this state, a change in the magnetic field due to an eddy current along with rotation of the sensor rotor is detected by the detection coil, thereby detecting the position of the sensor rotor with respect to the sensor stator.

In the position sensor (rotary sensor) described in Patent Literature 1, the two magnetic field shielding parts (gaps) and the two magnetic field non-shielding parts (conductive parts) are alternately arranged along the rotational direction of the sensor rotor (rotor), and at the time of one rotation of the sensor rotor, a plurality of cycles of changes in the magnetic field occur. Therefore, to which cycle an output signal from the detection coil corresponds cannot be determined, and detecting the absolute angle of the sensor rotor with respect to the sensor stator (stator) is difficult.

CITATION LIST

Patent Literature

Patent Literature 1: JP 2015-068640 A

SUMMARY OF INVENTION

It is an object of the present disclosure to provide a rotary sensor configured to easily detect an absolute angle of a rotor with respect to a stator and a sensor substrate.

A rotary sensor according to an aspect of the present disclosure is a rotary sensor configured to detect an angle of rotation of a rotary object. The rotary sensor includes a rotor and a stator. The rotor is conductive and is configured to be attached to the rotary object to rotate together with the rotary object. The stator faces the rotor in one direction. The rotor includes a plurality of conductive parts and a different-thickness part. The plurality of conductive parts are aligned along a rotational direction of the rotor. The different-thickness part relatively differs in thickness in the one direction. The rotor has a plurality of gaps provided to separate the plurality of conductive parts from each other. The stator includes a substrate, an excitation coil, a detection coil, and a detection electrode part. The substrate has a counter surface facing the rotor. The excitation coil is annularly arranged on the counter surface of the substrate such that the excitation coil lies along an outer edge of the rotor in plan view in the one direction, and the excitation coil is configured to generate a magnetic field. The detection coil is disposed inside the excitation coil on the counter surface of the substrate and configured to detect a change in the magnetic field. The detection electrode part is disposed on the counter surface of the substrate such that the detection electrode part overlaps part of a rotation trajectory of the different-thickness part at a time of rotation of the rotor in plan view in the one direction, and the detection electrode part is configured to detect capacitance generated between the capacitance and the rotor.

A sensor substrate according to an aspect of the present disclosure is applied to the substrate of the rotary sensor.

DESCRIPTION OF EMBODIMENTS

Figure 1:
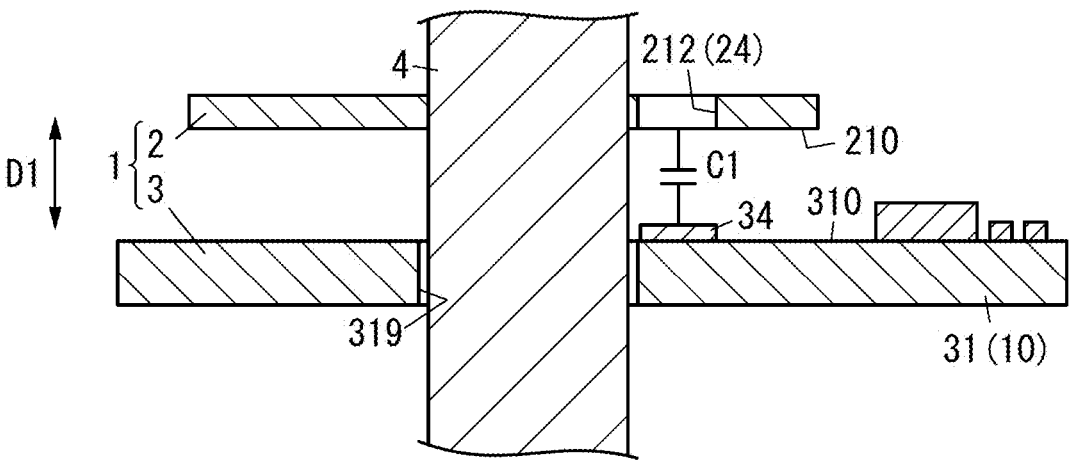
FIG. 1 is a sectional view of a rotary sensor according to a first embodiment in use.

A rotary sensor and a sensor substrate according to first to third embodiments will be described below with reference to the drawings. Figures described in the following first to third embodiments are schematic views, and therefore, the ratio of sizes and the ratio of thicknesses of components in the drawings do not necessarily reflect actual dimensional ratios. Moreover, configurations to be described in the first to third embodiments below are mere examples of the present disclosure. The present disclosure is not limited to the first to third embodiments described below. Various modifications may be made to the first to third embodiments described below depending on design and the like as long as the effect of the present disclosure is provided.

First Embodiment

With reference to FIGS. 1 to 10, a rotary sensor 1 and a sensor substrate 10 according to the first embodiment will be described below.

(1) Overview

First of all, the overview of the rotary sensor 1 and the sensor substrate 10 according to the first embodiment will be described with reference to FIGS. 1 and 2.

As shown in FIG. 1, the rotary sensor 1 according to the first embodiment is a sensor for detecting an angle of rotation of a rotary object 4. The rotary object 4 is, for example, a rotary shaft of an electric motor (motor) mounted on an electric vehicle (including a two-wheel vehicle), a hybrid vehicle (including a two-wheel vehicle), or industrial equipment (e.g., a robot arm) (hereinafter referred to also as a "rotary shaft 4"). The rotary sensor 1 is, for example, an inductive sensor. That is, in the rotary sensor 1, detecting a change in a magnetic field due to an eddy current along with rotation of a rotor 2 described later enables an angle of rotation of the rotor 2 with respect to a stator 3 described later to be detected.

Here, examples of the sensor for detecting the angle of rotation of the rotary object 4 include a sensor (MR sensor) using a magnetoresistive effect element and a sensor using a Hall element. These sensors can detect the angle of rotation of a rotary object 4 whose rotational velocity is about several thousands rpm, but these sensors may not be able to detect the rotational velocity of a rotary object 4 whose rotational velocity is greater than 10,000 rpm. In contrast, an inductive sensor such as the rotary sensor 1 can detect the rotational velocity of a rotary object 4 even when the rotational velocity of the rotary object 4 is greater than 10,000 rpm.

Incidentally, the rotary sensor 1 according to the first embodiment employs the following configuration to detect an absolute angle of the rotor 2 with respect to the stator 3.

Figure 2:
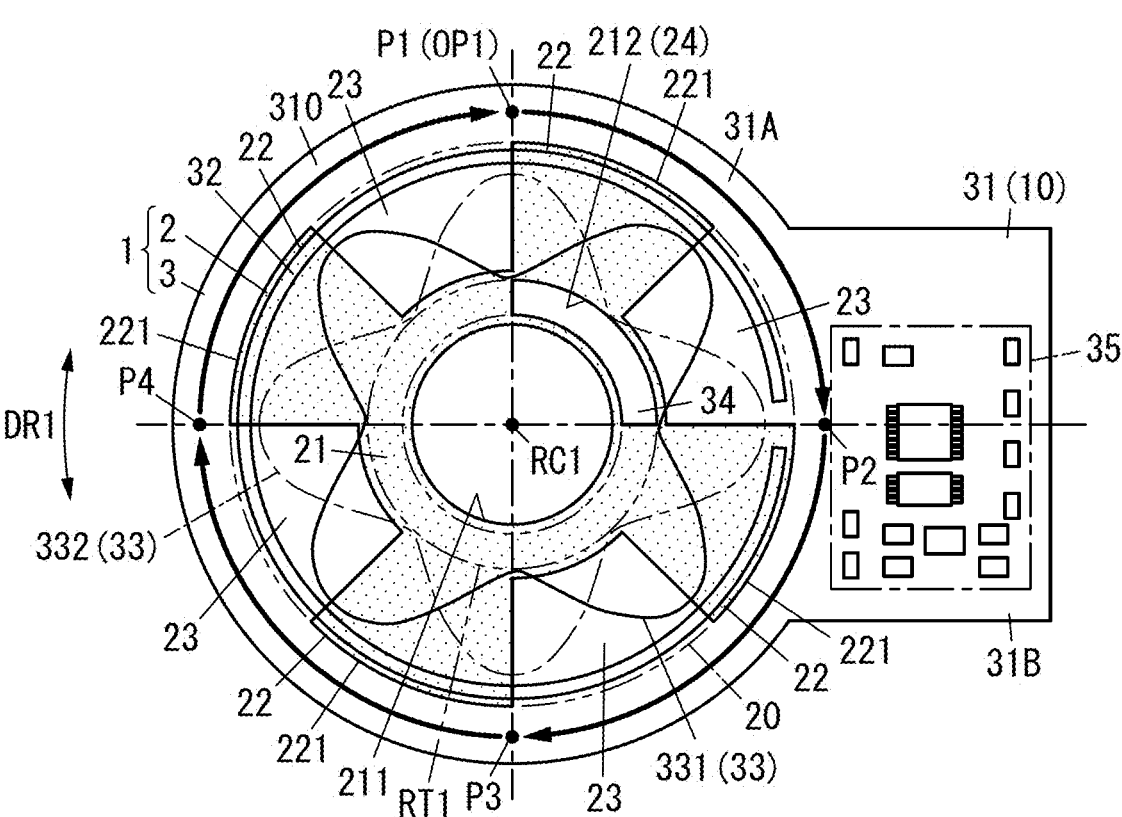
FIG. 2 is a plan view of the rotary sensor seen through a surface of a rotor.

That is, the rotary sensor 1 includes the rotor 2 and the stator 3 as shown in FIGS. 1 and 2. The rotor 2 is conductive and is configured to be attached to the rotary object 4 to rotate together with the rotary object 4. The stator 3 faces the rotor 2 in one direction D1. The rotor 2 includes a plurality of conductive parts 22 and a different-thickness part 24. The plurality of conductive parts 22 are aligned along a rotational direction DR1 of the rotor 2. The different-thickness part 24 differs in thickness in the one direction D1 relative to the plurality of conductive parts 22. In the rotary sensor 1, a plurality of gaps 23 are provided to separate the plurality of conductive parts 22 from each other. The stator 3 includes a substrate 31, an excitation coil 32, a detection coil 33, and a detection electrode part 34. The substrate 31 has a counter surface 310 facing the rotor 2. The excitation coil 32 is annularly arranged on the counter surface 310 of the substrate 31 such that the excitation coil 32 lies along an outer edge 20 of the rotor 2 in plan view in the one direction D1, and the excitation coil 32 generates a magnetic field. The excitation coil 32 is partially open in a circumferential direction and has both ends connected to an oscillator 352 described later. The detection coil 33 is disposed inside the excitation coil 32 on the counter surface 310 of the substrate 31 and detects a change in the magnetic field. The detection electrode part 34 is disposed on the counter surface 310 of the substrate 31 such that the detection electrode part 34 overlaps part of a rotation trajectory RT1 of the different-thickness part 24 at the time of rotation of the rotor 2 in plan view in the one direction D1, and the detection electrode part 34 detects capacitance C1 generated between the detection electrode part 34 and the rotor 2.

Moreover, the sensor substrate 10 is applied to the substrate 31 of the rotary sensor 1 described above.

In the rotary sensor 1 and the sensor substrate 10 having such a configuration, the capacitance C1 generated between the rotor 2 and the detection electrode part 34 can be detected by the detection electrode part 34. The value of the capacitance C1 detected by the detection electrode part 34 changes depending on a rotational position of the rotor 2 with respect to the stator 3, and therefore, based on the value of the capacitance C1 detected by the detection electrode part 34, a reference position OP1 of the rotor 2 with respect to the stator 3 can be detected. As a result, the absolute angle of the rotor 2 with respect to the stator 3 can be easily detected.

(2) Details

Next, details of the rotary sensor 1 and the sensor substrate 10 according to the first embodiment will be described with reference to FIGS. 1 to 7. Note that in FIG. 2, the rotor 2 is shaded with dots so that the rotor 2 and the stator 3 can be easily distinguished from each other, and the rotor 2 in FIG. 2 is not in cross section. Moreover, in each of FIG. 2, FIG. 4, and FIG. 6, a first detection coil 331 is shown by a solid line, and a second detection coil 332 is shown by a long dashed short dashed line so that the first detection coil 331 and the second detection coil 332 can be easily distinguished from each other.

The rotary sensor 1 according to the first embodiment is a sensor for detecting the angle of rotation of the rotary object 4 as described above. The rotary object 4 is, for example, a rotary shaft 4 of an electric motor as described above. The rotary sensor 1 includes the rotor 2 (target) and the stator 3 as shown in FIGS. 1 and 2.

(2.1) Rotor

Figure 3:
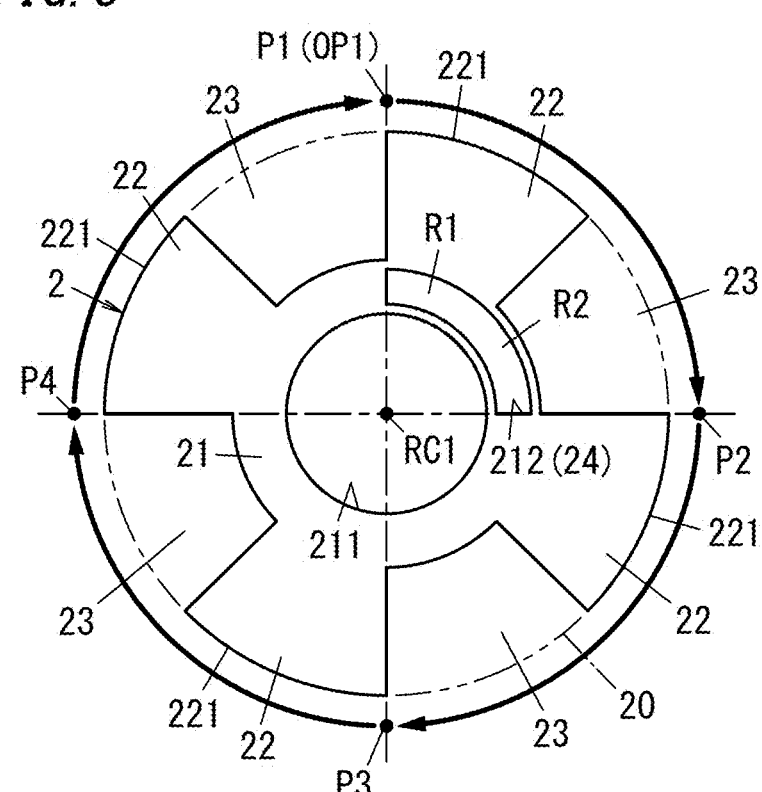
FIG. 3 is a plan view of the rotor to be applied to the rotary sensor.

The rotor 2 is formed from, for example, a conductor (a conductive material) such as a steel plate and is configured to be attached to the rotary object 4 to rotate together with the rotary object 4. The rotor 2 includes a rotor body 21, the plurality of (in the example shown in the figure, four) conductive parts 22, and the different-thickness part 24 as shown in FIGS. 2 and 3.

The rotor body 21 has an annular shape in plan view in the one direction D1. The one direction D1 is a direction in which the rotor 2 and the stator 3 face each other as shown in FIG. 1. In other words, the one direction D1 is a direction (up/down direction in FIG. 1) along the rotary shaft 4 as the rotary object 4. The rotor body 21 has a through hole 211. The through hole 211 penetrates through the rotor body 21 at a center part of the rotor body 21 in a thickness direction (direction perpendicular to a paper surface of FIG. 3) defined with respect to the rotor body 21. The through hole 211 has a circular shape in plan view in the one direction D1.

The plurality of conductive parts 22 are aligned along an outer edge of the rotor body 21 at equal intervals. That is, the plurality of conductive parts 22 are aligned along the rotational direction DR1 of the rotor 2. Each conductive part 22 protrudes outward from the outer edge of the rotor body 21. In the present embodiment, the rotor 2 includes four conductive parts 22, and two adjacent conductive parts 22 are shifted from each other by 90 degrees in the rotational direction DR1 of the rotor 2. In other words, the plurality of conductive parts 22 radially extend from a rotation center RC1 of the rotor 2.

Each of the plurality of conductive parts 22 has a fan shape in plan view in the one direction D1. In the rotor 2, the plurality of gaps 23 are provided to separate the plurality of conductive parts 22 from each other. That is, in the rotor 2, the plurality of conductive parts 22 and the plurality of gaps 23 are alternately aligned along the rotational direction DR1 of the rotor 2. In the present embodiment, the shape of each of the plurality of conductive parts 22 and the shape of each of the plurality of gaps 23 in plan view in the one direction D1 are substantially the same but may be different from each other. Moreover, in the present embodiment, the rotor body 21 and the plurality of conductive parts 22 are integral but may be separated from each other as long as the rotor body 21 are electrically connected to the conductive parts 22.

The different-thickness part 24 is disposed at the rotor body 21 and differs in thickness in the one direction D1 relative to the plurality of conductive parts 22. More specifically, the different-thickness part 24 is provided in a first region R1 and a second region R2 of the rotor body 21 as shown in FIG. 3. The first region R1 is a region between one conductive part 22 of the plurality of conductive parts 22 and the rotation center RC1 of the rotor 2. The second region R2 is a region between one gap 23 of the plurality of gaps 23 and the rotation center RC1 of the rotor 2. The rotation center RC1 of the rotor 2 is the center around which the rotor 2 is to rotate, and as shown in FIGS. 2 and 3, the rotation center RC1 is the center of the through hole 211. The different-thickness part 24 is in the shape of an arc in plan view in the one direction D1. More specifically, the different-thickness part 24 has an arc shape having a length of a quarter circle. In the present embodiment, the different-thickness part 24 is a through hole 212 penetrating through the rotor 2 in the one direction D1. The "different-thickness part" as used in the present disclosure is a part whose thickness in a direction in which the rotor and the stator face each other is different from the other parts (e.g., remaining parts of the rotor body), and is a concept including a through hole.

The rotor 2 having such a configuration is attached to the rotary shaft 4 in a state where the rotary shaft 4 is inserted in the through hole 211 of the rotor body 21. Note that in FIGS. 2 and 3, "P1(OP1)" is a reference position (origin point position) of the rotor 2 with respect to the stator 3 and is a position at which the angle of rotation (mechanical angle) of the rotor 2 with respect to the stator 3 is 0 degrees or 360 degrees. Moreover, in FIGS. 2 and 3, "P2" is a position at which the angle of rotation of the rotor 2 with respect to the stator 3 is 90 degrees. Further, in FIGS. 2 and 3, "P3" is a position at which the angle of rotation of the rotor 2 with respect to the stator 3 is 180 degrees. Furthermore, in FIGS. 2 and 3, "P4" is a position at which the angle of rotation of the rotor 2 with respect to the stator 3 is 270 degrees.

(2.2) Stator

Figure 4:
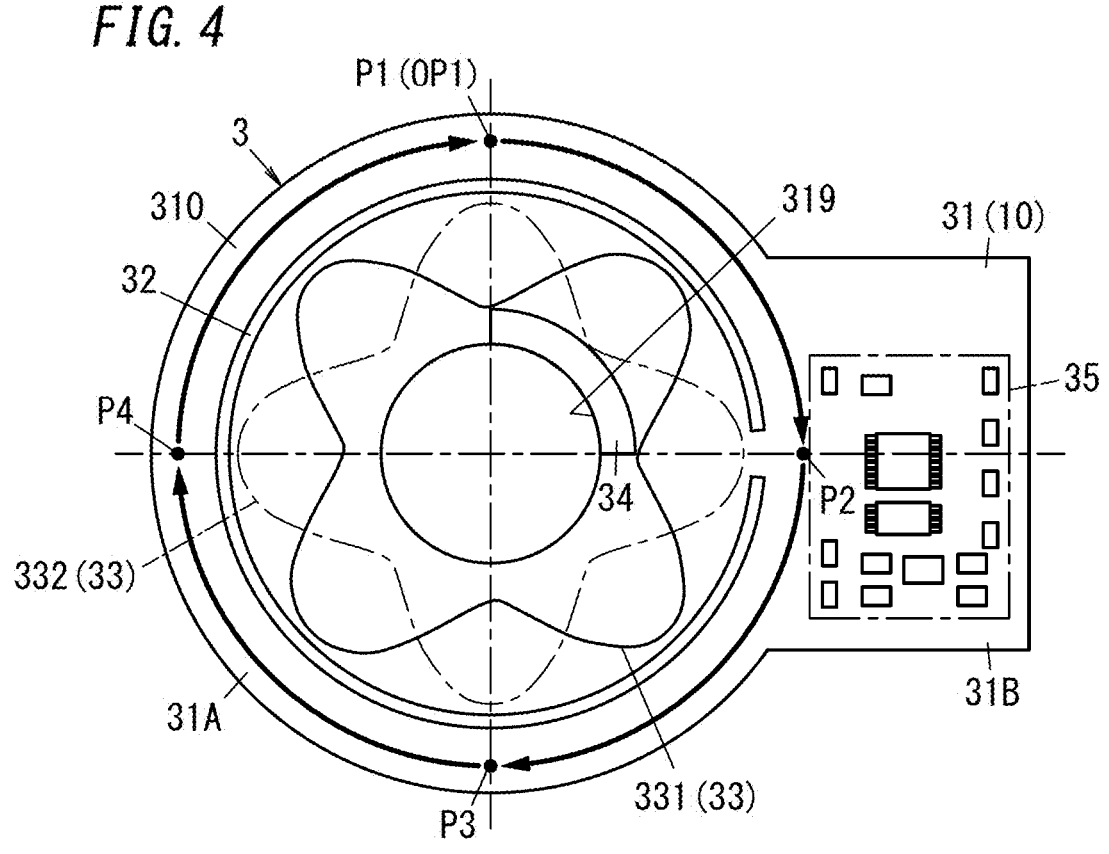
FIG. 4 is a plan view of a stator to be applied to the rotary sensor.

The stator 3 faces the rotor 2 attached to the rotary object 4 in the one direction D1. As shown in FIGS. 2 and 4, the stator 3 includes the substrate 31, the excitation coil 32, the detection coil 33, and the detection electrode part 34.

The substrate 31 is, for example, a printed wiring board made of a glass epoxy resin. As shown in FIGS. 2 and 4, the substrate 31 includes a first substrate part 31A and a second substrate part 31B. The first substrate part 31A has a circular shape in plan view in the one direction D1, and the excitation coil 32, the detection coil 33, and the detection electrode part 34 which will be described later are formed on the first substrate part 31A. The second substrate part 31B has a rectangular shape in plan view in the one direction D1, and a circuit block 35 described later is mounted on the second substrate part 31B. As shown in FIG. 4, the first substrate part 31A and the second substrate part 31B are integral. As shown in FIGS. 1 and 4, the substrate 31 has a through hole 319 penetrating through the substrate 31 in a thickness direction defined with respect to the substrate 31. The through hole 319 is a hole in which the rotary shaft 4 is to be inserted, and the through hole 319 has an opening diameter which is larger than the diameter of the rotary shaft 4 (see FIG. 1). In the present embodiment, the first substrate part 31A and the second substrate part 31B are integral but may be separated from each other as long as the first substrate part 31A and the second substrate part 31B are electrically connected to each other.

Figure 5:
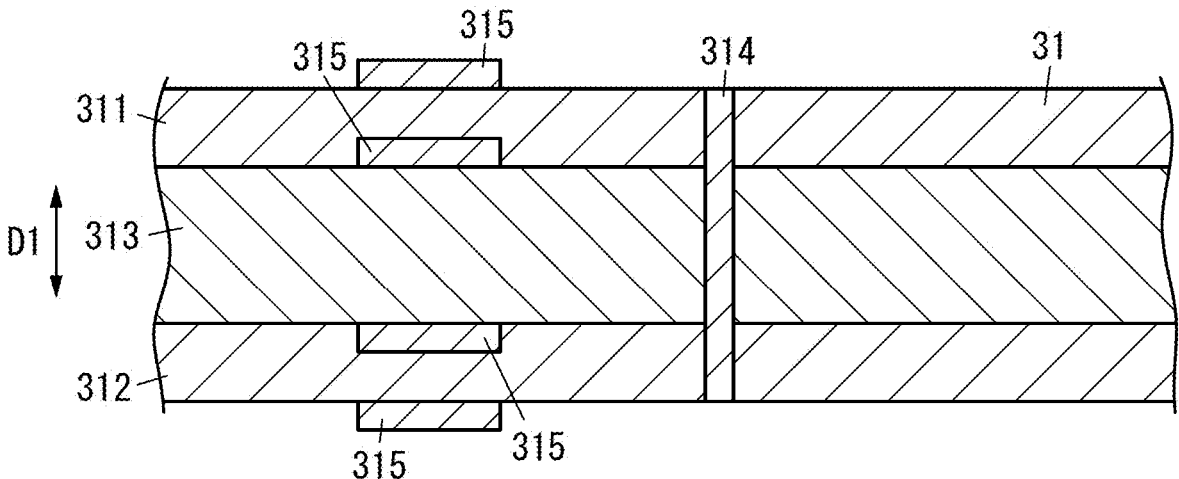
FIG. 5 is a sectional view of a substrate to be applied to the rotary sensor.

As shown in FIG. 5, the substrate 31 includes a plurality of (in the example shown in the figure, two) prepregs 311 and 312 and a core 313. The plurality of prepregs 311 and 312 are located on both sides of the core 313 in the one direction D1. On an opposite surface of the prepreg 311 from the core 313, a pattern part 315 forms the excitation coil 32 and a first portion 33A (see FIG. 6) of the detection coil 33. On a surface of the core 313 facing the prepreg 311, a pattern part 315 forms a second portion 33B (see FIG. 6) of the detection coil 33.

The first portion 33A of the detection coil 33 includes: a part of the first detection coil 331 described later (a first portion 33A of the first detection coil 331); and a part of the second detection coil 332 described later (a first portion 33A of the second detection coil 332). The second portion 33B of the detection coil 33 includes: the remaining portion of the first detection coil 331 (a second portion 33B of the first detection coil 331) except for the part included in the first portion 33A of the detection coil 33; and the remaining portion of the second detection coil 332 (a second portion 33B of the second detection coil 332) except for the part included in the first portion 33A of the detection coil 33.

Figure 6:
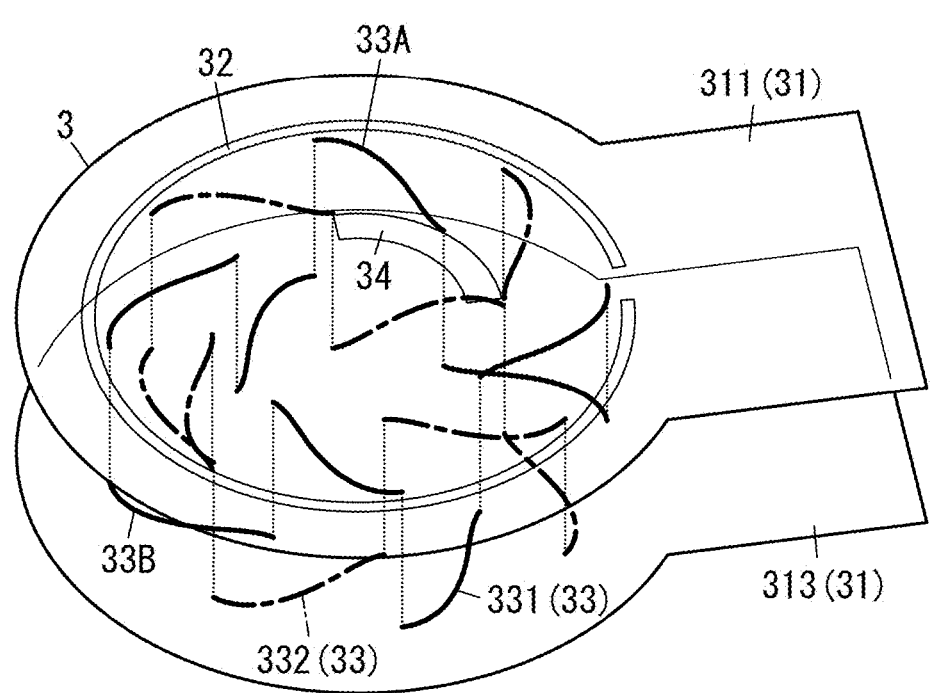
FIG. 6 is a conceptual view of a connection example of a detection coil to be applied to the rotary sensor.

That is, as shown in FIG. 6, the first portion 33A of the detection coil 33 is disposed on the surface of the prepreg 311 of the substrate 31, and the second portion 33B of the detection coil 33 is disposed on a surface of the core 313 of the substrate 31. Moreover, the first portion 33A of the detection coil 33 disposed on the surface of the prepreg 311 and the second portion 33B of the detection coil 33 disposed on the surface of the core 313 are electrically connected to each other by a via 314 (see FIG. 5). Note that a pattern part 315 disposed on a surface of the core 313 facing the prepreg 312 and a pattern part 315 disposed on an opposite surface of the prepreg 312 from the core 313 are wires connecting electronic components included in, for example, the circuit block 35 to each other.

The excitation coil 32 (a transmission coil) is annularly arranged on the counter surface 310 of the substrate 31. The counter surface 310 is a surface facing the rotor 2 in the one direction D1 (direction in which the rotor 2 and the stator 3 face each other). That is, the substrate 31 has the counter surface 310 facing the rotor 2. More specifically, the excitation coil 32 is annularly arranged on the counter surface 310 of the substrate 31 such that the excitation coil 32 lies along the outer edge 20 of the rotor 2 in plan view in the one direction D1. Here, the "outer edge 20 of the rotor 2" is a circumference including an arc-shaped outer edge 221 along the rotational direction DR1 of the rotor 2 in each of the plurality of conductive parts 22 as shown in FIGS. 2 and 3. When an alternate current output from the oscillator 352 (see FIG. 7) described later flows through the excitation coil 32, the excitation coil 32 generates an alternating current magnetic field penetrating through the excitation coil 32 along the one direction D1. Here, the frequency of the alternate current output from the oscillator 352 is, for example, 1 MHz to 10 MHz.

The detection coil 33 (a reception coil) is disposed inside the excitation coil 32 on the counter surface 310 of the substrate 31. The detection coil 33 detects a change in the alternating current magnetic field generated from the excitation coil 32. As shown in FIG. 4, the detection coil 33 includes the first detection coil 331 and the second detection coil 332. The first detection coil 331 and the second detection coil 332 are shifted from each other by 45 degrees in the rotational direction DR1 of the rotor 2. Thus, the first detection coil 331 detects a first voltage signal corresponding to a first sine wave signal according to the angle of rotation of the rotor 2 with respect to the stator 3. Moreover, the second detection coil 332 detects a second voltage signal corresponding to a first cosine wave signal according to the angle of rotation of the rotor 2 with respect to the stator 3.

The detection electrode part 34 is disposed on the counter surface 310 of the substrate 31. More specifically, as shown in FIG. 2, the detection electrode part 34 is disposed on the counter surface 310 of the substrate 31 such that in plan view in the one direction D1 (direction perpendicular to a paper surface of FIG. 2), the detection electrode part 34 overlaps part of the rotation trajectory RT1 of the different-thickness part 24 at the time of rotation of the rotor 2. The detection electrode part 34 has, for example, an arc shape having a length of a quarter circle. The detection electrode part 34 overlaps the different-thickness part 24 in plan view in the one direction D1 in a state where the rotor 2 is located at the reference position OP1 with respect to the stator 3 (in the state shown in FIG. 2). That is, the detection electrode part 34 has the same size as the different-thickness part 24. The detection electrode part 34 detects the capacitance C1 (see FIG. 1) generated between the detection electrode part 34 and a counter surface 210 of the rotor 2, the counter surface 210 facing the stator 3. Note that when the different-thickness part 24 is the through hole 212, no capacitance C1 is generated between the different-thickness part 24 and the detection electrode part 34 in a state where the different-thickness part 24 and the detection electrode part 34 overlap each other in plan view in the one direction D1, and therefore, the capacitance is substantially 0.

(2.3) Circuit Configuration

Next, the circuit configuration of the rotary sensor 1 will be described with reference to FIG. 7.

Figure 7:
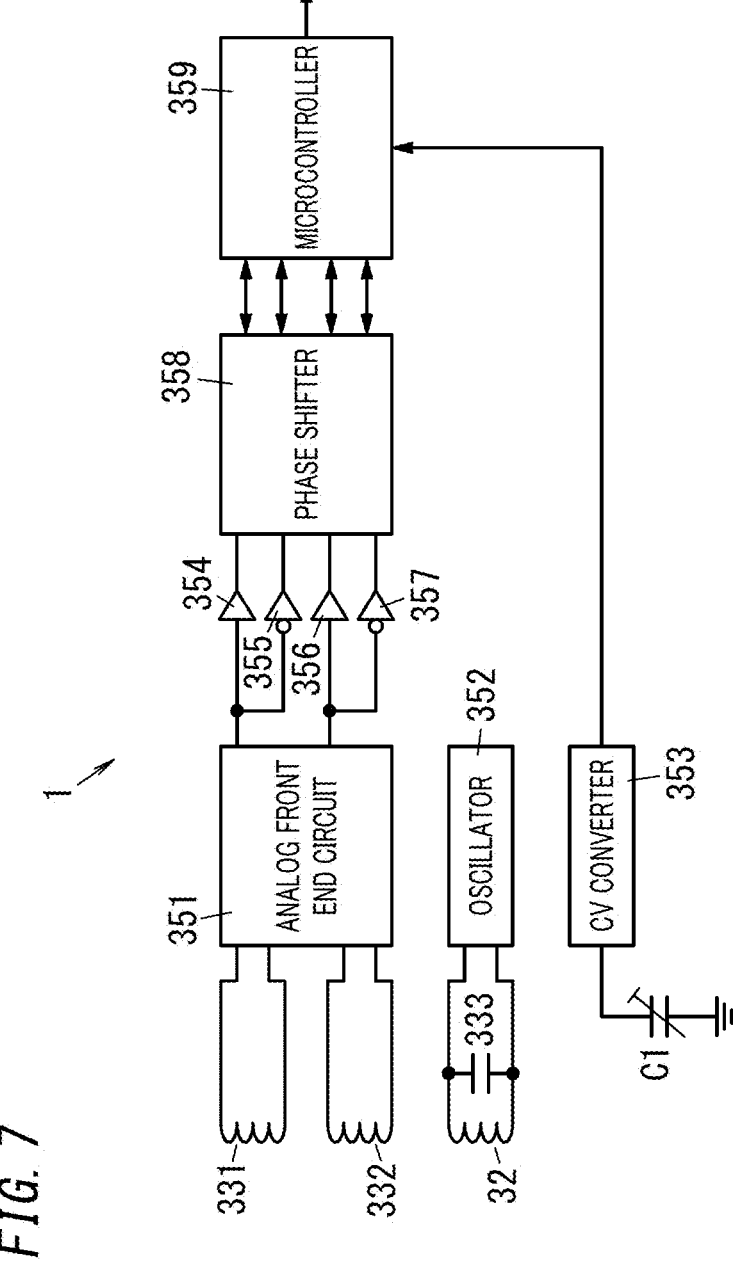
FIG. 7 is a circuit block diagram of the rotary sensor.

As shown in FIG. 7, the rotary sensor 1 includes an analog front end circuit 351, the oscillator 352, a CV converter 353, a plurality of (in the example shown in the figure, two) buffers 354 and 356, a plurality of (in the example shown in the figure, two) inverters 355 and 357, a phase shifter 358, and a microcontroller 359. The analog front end circuit 351, the oscillator 352, the CV converter 353, the plurality of buffers 354 and 356, the plurality of inverters 355 and 357, the phase shifter 358, and the microcontroller 359 are composed of the circuit block 35 (see FIG. 2) including a plurality of electronic components.

The analog front end circuit 351 receives the first voltage signal from the first detection coil 331 and the second voltage signal from the second detection coil 332, demodulates the first voltage signal to the first sine wave signal, and demodulates the second voltage signal to the first cosine wave signal. Moreover, the analog front end circuit 351 adjusts a gain of each of the first sine wave signal and the first cosine wave signal.

The oscillator 352 outputs an alternate current of, for example, 1 to 10 MHz to the excitation coil 32. Between both ends of the excitation coil 32, a capacitor 333 is connected. When the alternate current from the oscillator 352 flows through the excitation coil 32, the excitation coil 32 generates an alternating current magnetic field penetrating through the excitation coil 32 along the one direction D1.

The CV converter 353 is electrically connected to the detection electrode part 34 and outputs the alternate current to the detection electrode part 34. The CV converter 353 converts a change in the capacitance C1 generated between the rotor 2 and the detection electrode part 34 into a voltage change and further converts the voltage change into a digital signal. The CV converter 353 outputs the digital signal to the microcontroller 359. Here, the frequency of the alternate current from the oscillator 352 to the excitation coil 32 is 1 to 10 MHz as described above. Therefore, the frequency of the alternate current from the CV converter 353 to the detection electrode part 34 is preferably less than 1 MHz or greater than 10 MHz. This can suppress the influence of the alternating current magnetic field over the capacitance C1. Note that the frequency of the alternate current from the CV converter 353 to the detection electrode part 34 is more preferably less than 1 MHz, and is desirably about, for example, 100 kHz.

The buffer 354 outputs the first sine wave signal from the analog front end circuit 351. The inverter 355 outputs a second sine wave signal obtained by inverting the phase of the first sine wave signal from the analog front end circuit 351. The buffer 356 outputs the first cosine wave signal from the analog front end circuit 351. The inverter 357 outputs a second cosine wave signal obtained by inverting the phase of the first cosine wave signal from the analog front end circuit 351.

The phase shifter 358 detects a phase of each of the first sine wave signal, the second sine wave signal, the first cosine wave signal, and the second cosine wave signal input through the plurality of buffers 354 and 356 and the plurality of inverters 355 and 357.

The microcontroller 359 has memory. The microcontroller 359 executes a program stored in the memory, thereby executing origin point calibration and angle detection which will be described later. The microcontroller 359 calibrates, based on the digital signal from the CV converter 353, the reference position OP1 (origin point position) of the rotor 2 in the origin point calibration. Moreover, the microcontroller 359 detects (calculates), based on the phase of each of the first sine wave signal, the second sine wave signal, the first cosine wave signal, and the second cosine wave signal, the angle of rotation (absolute angle) of the rotor 2 in the angle detection. Note that the origin point calibration and the angle detection will be described in "(3) Origin Point Calibration and Angle Detection" below.

(3) Origin Point Calibration and Angle Detection

Next, the origin point calibration and the angle detection executed by the microcontroller 359 will be described with reference to FIGS. 8A and 8B.

Figure 8A:
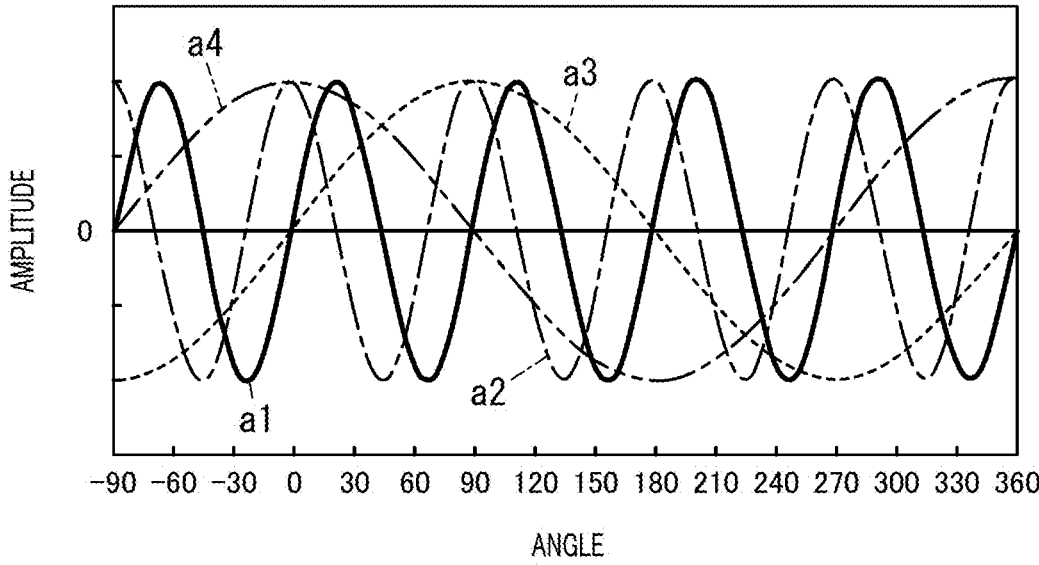
FIG. 8A is a graph of a change in a detection signal of the rotary sensor.

FIG. 8A is a graph of a change in a detection signal of the rotary sensor 1 according to the first embodiment. In the rotary sensor 1, the first sine wave signal detected by the first detection coil 331 includes four cycles of sine waves at the time of one rotation of the rotor 2 as shown by a solid line a1 of FIG. 8A. Moreover, in the rotary sensor 1, the first cosine wave signal detected by the second detection coil 332 includes four cycles of sine waves at the time of one rotation of the rotor 2 as shown by a long dashed short dashed line a2 of FIG. 8A. Note that in FIG. 8A, a broken line a3 shows a change in the angle of rotation (mechanical angle) of the rotor 2 corresponding to the first cosine wave signal, and a long dashed double-short dashed line a4 shows a change in the angle of rotation of the rotor 2 corresponding to the first sine wave signal.

Figure 8B:
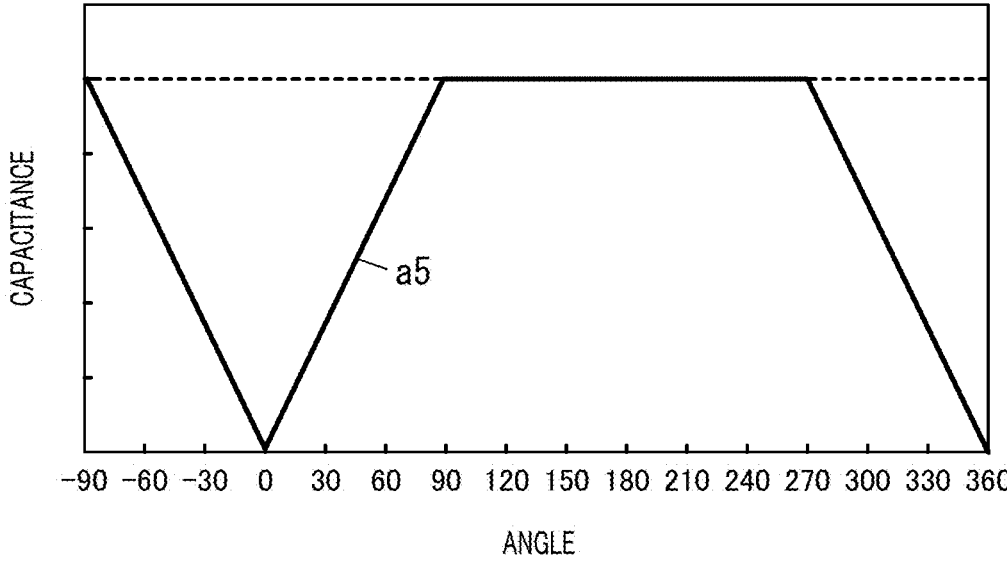
FIG. 8B is a graph of a change in capacitance of the rotary sensor.

FIG. 8B is a graph of a change in the capacitance C1 of the rotary sensor 1 according to the first embodiment. In the rotary sensor 1, the capacitance C1 changes as indicated by a solid line a5 of FIG. 8B. More specifically, the capacitance C1 is minimum when the angle of rotation of the rotor 2 is 0 degrees or 360 degrees. Moreover, the capacitance C1 linearly increases in the range in which the angle of rotation of the rotor 2 is greater than or equal to 0 degrees and less than or equal to 90 degrees, the capacitance C1 is constant in the range in which the angle of rotation of the rotor 2 is greater than or equal to 90 degrees and less than or equal to 270 degrees, and the capacitance C1 is linearly decreases in the range in which the angle of rotation of the rotor 2 is greater than or equal to 270 degrees and less than or equal to 360 degrees.

(3.1) Origin Point Calibration

As described above, the microcontroller 359 receives a digital signal corresponding to the capacitance C1 generated between the rotor 2 and the detection electrode part 34. As shown in FIG. 8B, the capacitance C1 is minimum when the angle of rotation (mechanical angle) of the rotor 2 is 0 degrees, that is, when the rotor 2 is located at the reference position OP1. Thus, the microcontroller 359 calibrates the angle of rotation of the rotor 2 when the capacitance C1 is minimum to 0 degrees, that is, to the reference position OP1 of the rotor 2.

(3.2) Angle Detection

As described above, the microcontroller 359 receives the phase of each of the first sine wave signal, the second sine wave signal, the first cosine wave signal, and the second cosine wave signal. Thus, the microcontroller 359 detects, based on the phase of each of the first sine wave signal, the second sine wave signal, the first cosine wave signal, and the second cosine wave signal, the angle of rotation (absolute angle) of the rotor 2.

(4) Effects

In the rotary sensor 1 and the sensor substrate 10 according to the first embodiment, the capacitance C1 generated between the rotor 2 and the detection electrode part 34 can be detected by the detection electrode part 34. Thus, based on the value of the capacitance C1 detected by the detection electrode part 34, the reference position (origin point position) OP1 of the rotor 2 with respect to the stator 3 can be detected. As a result, the absolute angle of the rotor 2 with respect to the stator 3 can be easily detected. Moreover, in the rotary sensor 1 and the sensor substrate 10 according to the first embodiment, it can also be detected, based on the change in the capacitance C1, that the rotary sensor 1 is operating.

In the rotary sensor 1 according to the first embodiment, the different-thickness part 24 is disposed in the first region R1 and the second region R2. Therefore, rotation stability of the rotor 2 can be improved as compared with the case where the different-thickness part 24 is disposed at the conductive part 22. Moreover, the change in the capacitance C1 is large as compared with the case where the different-thickness part 24 is disposed in only one of the first region R1 and the second region R2, and as a result, the absolute angle of the rotor 2 with respect to the stator 3 is easily detected.

In the rotary sensor 1 according to the first embodiment, the detection electrode part 34 overlaps the different-thickness part 24 in plan view in the one direction D1 in a state where the rotor 2 is located at the reference position OP1 with respect to the stator 3. Therefore, the position of the rotor 2 where the capacitance C1 is minimum can be defined as the reference position OP1.

In the rotary sensor 1 according to the first embodiment, the different-thickness part 24 is the through hole 212 penetrating through the rotor 2 in the one direction D1. Thus, the different-thickness part 24 can be easily formed.

(5) Variations

The first embodiment is a mere example of various embodiments of the present disclosure. The first embodiment may be modified in various manners depending on the design or the like as long as the object of the present disclosure is achieved. Variations of the first embodiment will be described below. Any of the variations to be described below may be combined as appropriate.

(5.1) First Variation

Figure 9:
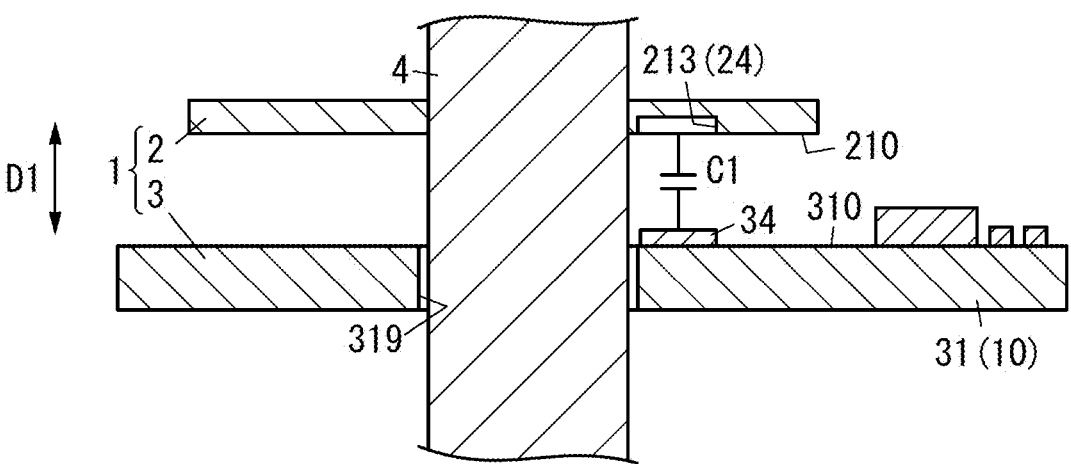
FIG. 9 is a sectional view of a rotary sensor according to a first variation of the first embodiment in use.

In the first embodiment, the different-thickness part 24 is the through hole 212 penetrating through the rotor body 21. However, the different-thickness part 24 may be a recess 213 formed in the counter surface 210 of the rotor 2 as shown in FIG. 9. The counter surface 210 of the rotor 2 is a surface facing the stator 3 in the one direction D1 as shown in FIG. 9. That is, in the rotary sensor 1 according to the first variation, the different-thickness part 24 is the recess 213 formed in the counter surface 210, which faces the stator 3, of the rotor 2. In sum, it is required only that the different-thickness part 24 differs in thickness in the one direction D1 relative to the plurality of conductive parts 22, and the different-thickness part 24 may be the recess 213.

Also in the rotary sensor 1 according to the first variation, the reference position OP1 of the rotor 2 with respect to the stator 3 can be detected based on the value of the capacitance C1 detected by the detection electrode part 34, and as a result, the absolute angle of the rotor 2 with respect to the stator 3 can be easily detected. Moreover, also in the rotary sensor 1 according to the first variation, the different-thickness part 24 can be easily formed.

(5.2) Second Variation

Figure 10:
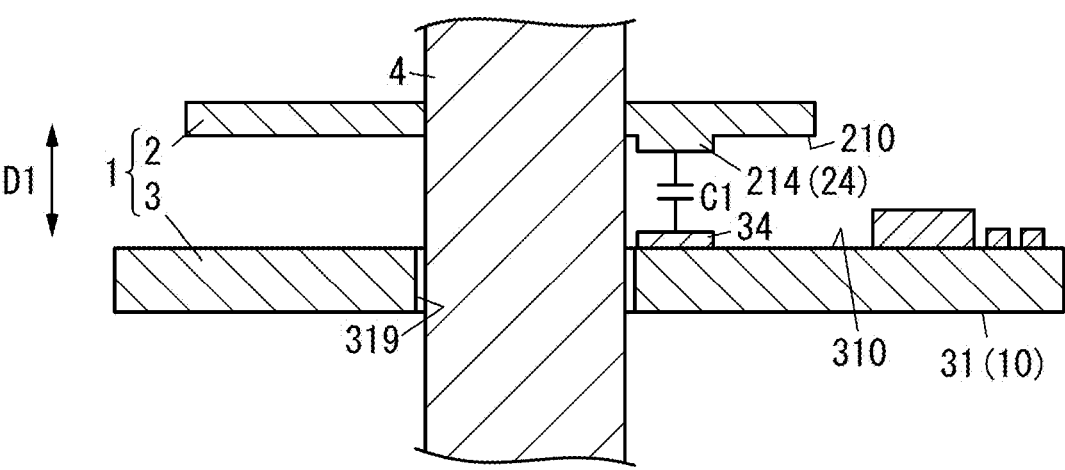
FIG. 10 is a sectional view of a rotary sensor according to a second variation of the first embodiment in use.

In the first embodiment, the different-thickness part 24 is the through hole 212 penetrating through the rotor body 21. However, the different-thickness part 24 may be a projection 214 disposed at the counter surface 210 of the rotor 2 as shown in FIG. 10. The counter surface 210 of the rotor 2 is a surface facing the stator 3 in the one direction D1 as shown in FIG. 10. That is, in the rotary sensor 1 according to the second variation, the different-thickness part 24 is the projection 214 disposed at the counter surface 210, which faces the stator 3, of the rotor 2. In sum, it is required only that the different-thickness part 24 differs in thickness in the one direction D1 relative to the plurality of conductive parts 22, and the different-thickness part 24 may be the projection 214.

Also in the rotary sensor 1 according to the second variation, the reference position OP1 of the rotor 2 with respect to the stator 3 can be detected based on the value of the capacitance C1 detected by the detection electrode part 34, and as a result, the absolute angle of the rotor 2 with respect to the stator 3 can be easily detected.

(5.3) Other Variations

In the first embodiment, the different-thickness part 24 is disposed at the rotor body 21. However, the different-thickness part 24 may be disposed at, for example, one conductive part 22 of the plurality of conductive parts 22.

In the first embodiment, the rotor 2 includes the four conductive parts 22, but the rotor 2 may include, for example, two, three, or five or more conductive parts 22.

The shape of the detection coil 33 (the first detection coil 331 and the second detection coil 332) is an example is not limited to the shape shown in FIG. 4 as long as it is a shape which can detect the sine wave signal and the cosine wave signal.

Second Embodiment

With reference to FIGS. 11 to 16, a rotary sensor 1A according to a second embodiment will be described. The rotary sensor 1A according to the second embodiment is different from the rotary sensor 1 according to the first embodiment in that a detection electrode part 34A includes a first electrode portion 341, a second electrode portion 342, and a third electrode portion 343. Note that in the rotary sensor 1A according to the second embodiment, components similar to those in the rotary sensor 1 according to the first embodiment are denoted by the same reference signs as those in the first embodiment, and the description thereof is omitted.

(1) Configuration

Figure 11:
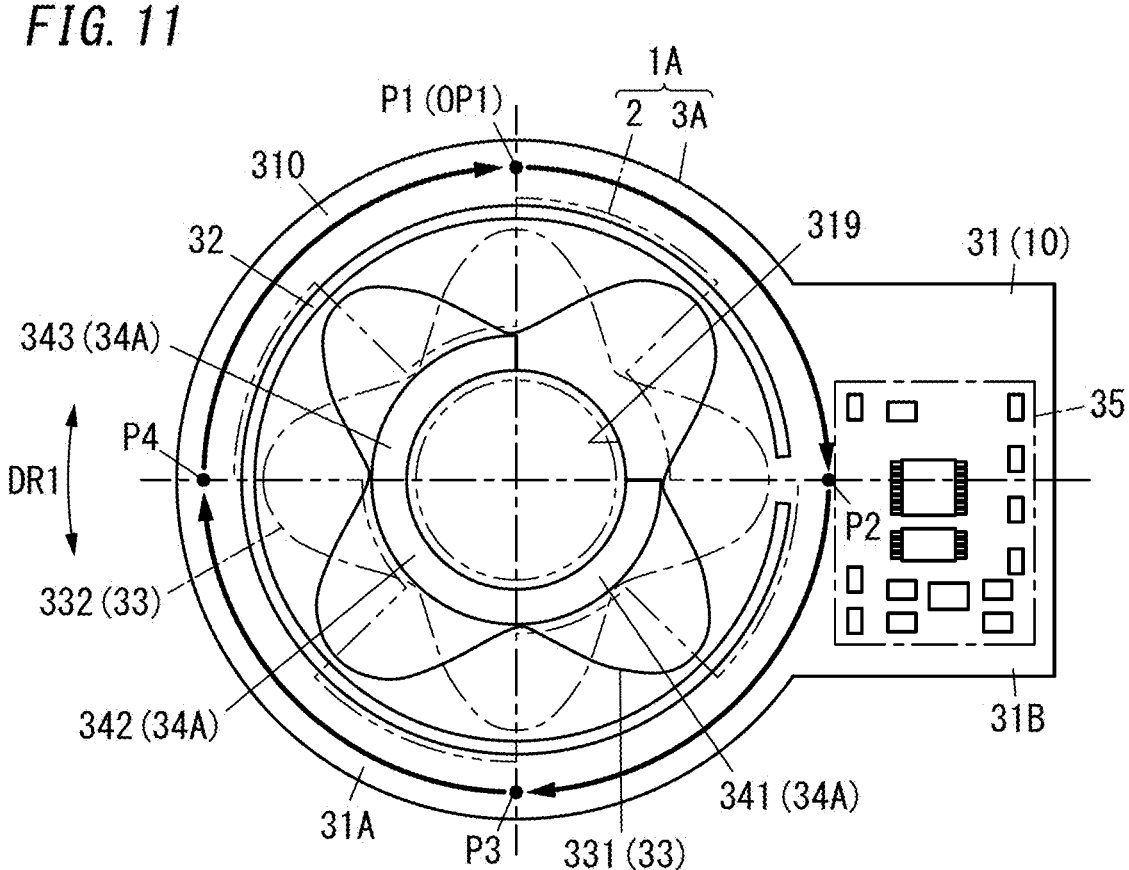
FIG. 11 is a plan view of a rotary sensor according to a second embodiment.

As shown in FIG. 11, the rotary sensor 1A according to the second embodiment includes a rotor 2 and a stator 3A.

The rotor 2 includes a rotor body 21 (see FIG. 3), a plurality of conductive parts 22 (see FIG. 3), and a different-thickness part 24 (see FIG. 3).

As shown in FIG. 11, the stator 3A includes a substrate 31, an excitation coil 32, a detection coil 33, and the detection electrode part 34A.

The detection electrode part 34A includes the first electrode portion 341, the second electrode portion 342, and the third electrode portion 343. The first electrode portion 341 overlaps the different-thickness part 24 (see FIG. 3) of the rotor 2 in plan view in one direction D1 when the rotor 2 has rotated 90 degrees clockwise in FIG. 11, from a first state where the rotor 2 is located at a reference position OP1 with respect to the stator 3A, to a second state (that is, when the rotor 2 has rotated 90 degrees from the reference position OP1). The second electrode portion 342 overlaps the different-thickness part 24 (see FIG. 3) of the rotor 2 in plan view in the one direction D1 when the rotor 2 has rotated 90 degrees clockwise in FIG. 11, from the second state, to a third state (that is, when the rotor 2 has rotated 180 degrees from the reference position OP1). The third electrode portion 343 overlaps the different-thickness part 24 (see FIG. 3) of the rotor 2 in plan view in the one direction D1 when the rotor 2 has rotated 90 degrees clockwise in FIG. 11, from the third state, to a fourth state (that is, when the rotor 2 has rotated 270 degrees from the reference position OP1). As shown in FIG. 11, the first electrode portion 341, the second electrode portion 342, and the third electrode portion 343 are integral along a rotational direction DR1 of the rotor 2.

Figure 12A:
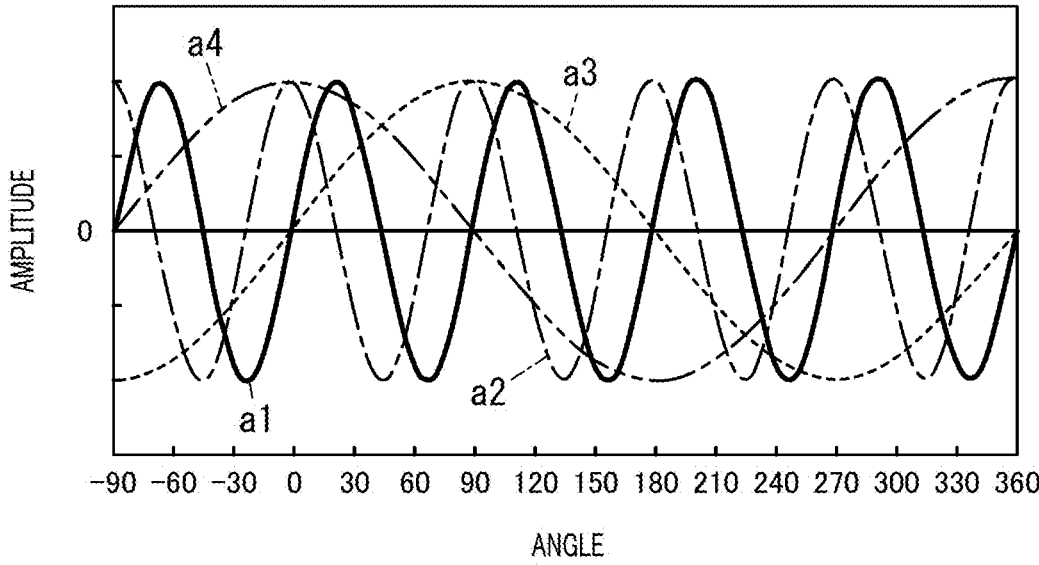
FIG. 12A is a graph of a change in a detection signal of the rotary sensor of the second embodiment.

In the rotary sensor 1A according to the second embodiment, a first sine wave signal detected by a first detection coil 331 changes as indicated by a solid line a1 of FIG. 12A, and a first cosine wave signal detected by a second detection coil 332 changes as indicated by a long dashed short dashed line a2 of FIG. 12A. Note that a "broken line a3" of FIG. 12A is an angle of rotation (mechanical angle) of the rotor 2 corresponding to the first cosine wave signal, and a "long dashed double-short dashed line a4" of FIG. 12A is an angle of rotation of the rotor 2 corresponding to the first sine wave signal.

Figure 12B:
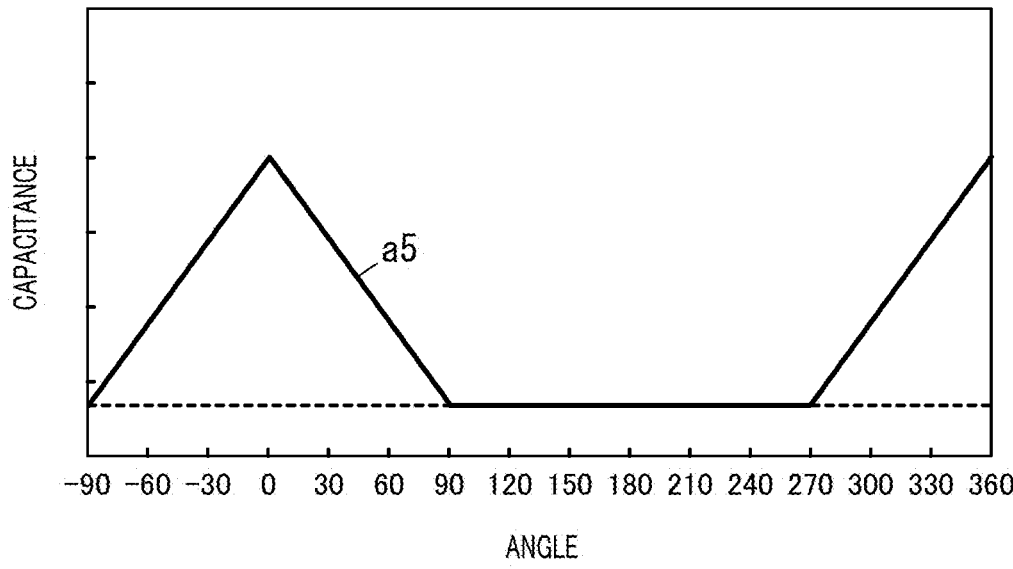
FIG. 12B is a graph of a change in capacitance of the rotary sensor of the second embodiment.

In the rotary sensor 1A according to the second embodiment, capacitance C1 detected by the detection electrode part 34A changes as indicated by a solid line a5 of FIG. 12B. More specifically, the capacitance C1 is maximum when the angle of rotation (mechanical angle) of the rotor 2 is 0 degrees or 360 degrees. Moreover, the capacitance C1 linearly decreases in the range in which the angle of rotation of the rotor 2 is greater than or equal to 0 degrees and less than or equal to 90 degrees, the capacitance C1 is constant in the range in which the angle of rotation of the rotor 2 is greater than or equal to 90 degrees and less than or equal to 270 degrees, and, and the capacitance C1 linearly increases in the range in which the angle of rotation of the rotor 2 is greater than or equal to 270 degrees and less than or equal to 360 degrees.

Thus, in the rotary sensor 1A according to the second embodiment, a position where the capacitance C1 is maximum can be calibrated to the reference position OP1 (origin point position). As a result, the absolute angle of the rotor 2 with respect to the stator 3A can be easily detected. Moreover, in the rotary sensor 1A according to the second embodiment, it can also be detected, based on the change in the capacitance C1, that the rotary sensor 1A is operating.

US 12,698,984 B2

13

(2) Variations

Variations of the second embodiment will be described below. Any of the variations to be described below may be combined as appropriate.

(2.1) First Variation

Figure 13:
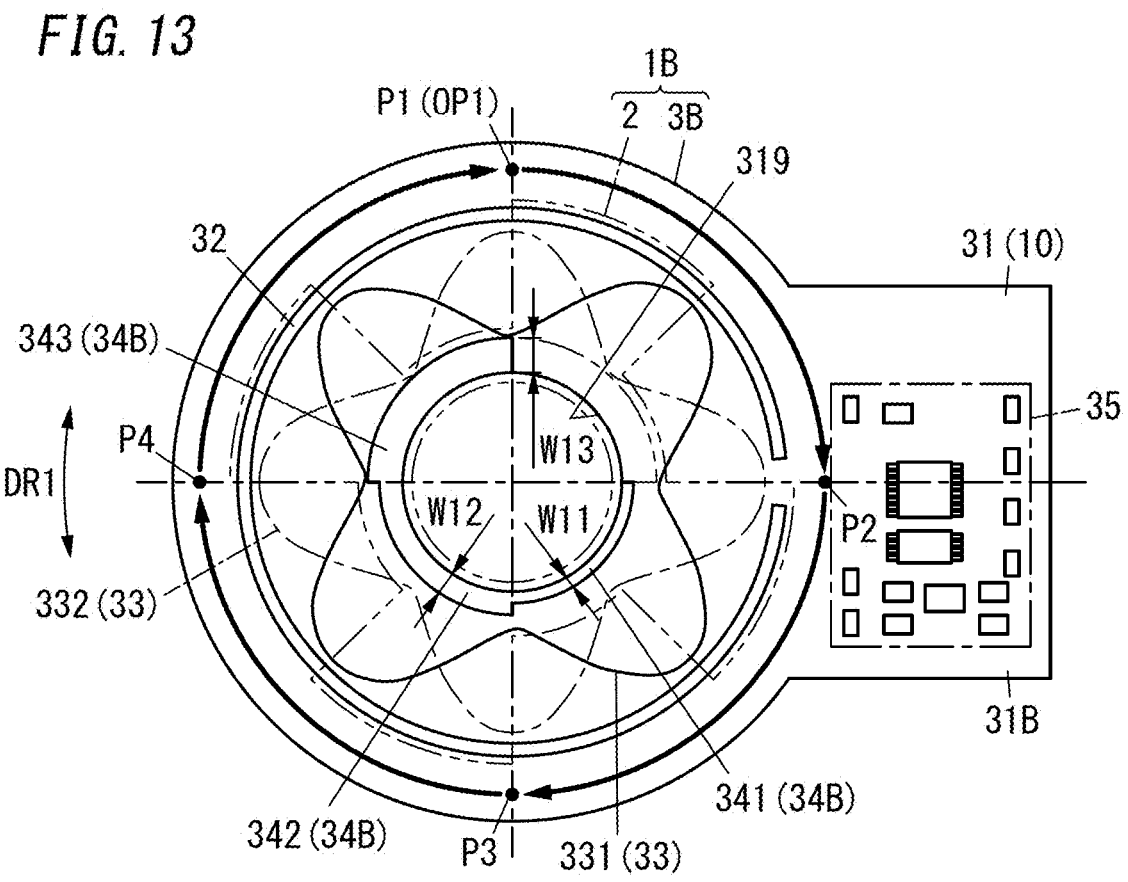
FIG. 13 is a plan view of a rotary sensor of a first variation of the second embodiment.

In the second embodiment, the width of the first electrode portion 341, the width of the second electrode portion 342, and the width of the third electrode portion 343 in a direction orthogonal to the rotational direction DR1 of the rotor 2 (hereinafter referred to as an "orthogonal direction") are the same (see FIG. 11). In contrast, the width of the first electrode portion 341, the width of the second electrode portion 342, and the width of the third electrode portion 343 in the orthogonal direction may be different from one another as shown in FIG. 13. A rotary sensor 1B according to a first variation will be described below with reference to FIGS. 13, 14A, and 14B.

In the rotary sensor 1B according to the first variation, a detection electrode part 34B includes a first electrode portion 341, a second electrode portion 342, and a third electrode portion 343. The first electrode portion 341, the second electrode portion 342, and the third electrode portion 343 are integral along the rotational direction DR1 of the rotor 2.

In the rotary sensor 1B according to the first variation, a width W11 of the first electrode portion 341 in the orthogonal direction is narrower than a width W12 of the second electrode portion 342 in the orthogonal direction as shown in FIG. 13. Moreover, in the rotary sensor 1B according to the first variation, the width W12 of the second electrode portion 342 in the orthogonal direction is narrower than a width W13 of the third electrode portion 343 in the orthogonal direction. That is, in the rotary sensor 1B according to the first variation, the width W11 of the first electrode portion 341, the width W12 of the second electrode portion 342, and the width W13 of the third electrode portion 343 are narrow in the order of the first electrode portion 341, the second electrode portion 342, and the third electrode portion 343. In sum, the width W11 of the first electrode portion 341, the width W12 of the second electrode portion 342, and the width W13 of the third electrode portion 343 stepwise vary.

Figure 14A:
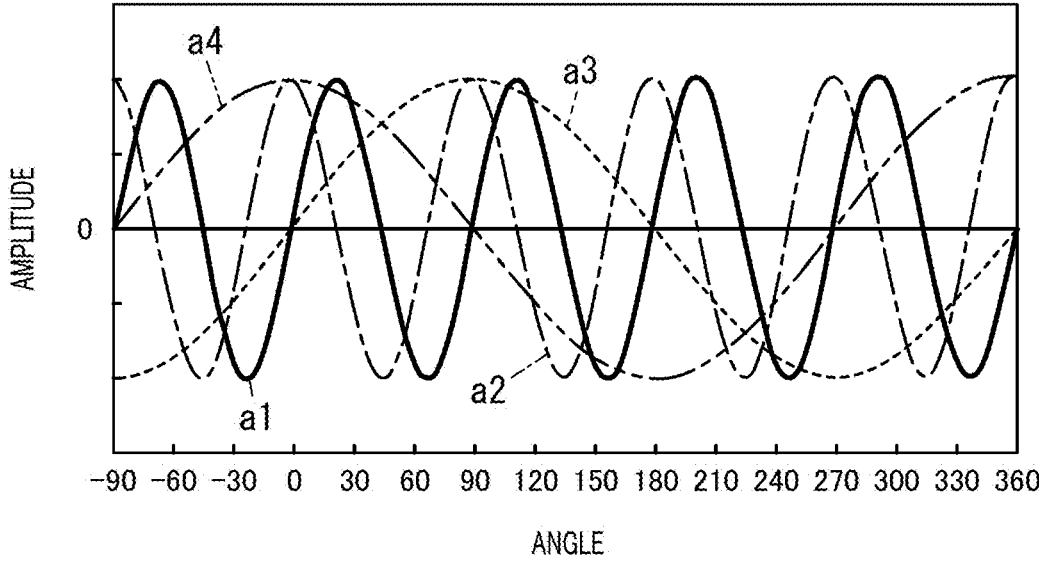
FIG. 14A is a graph of a change in a detection signal of the rotary sensor of the first variation of the second embodiment.

In the rotary sensor 1B according to the first variation, a first sine wave signal detected by the first detection coil 331 changes as indicated by a solid line a1 of FIG. 14A, and a first cosine wave signal detected by the second detection coil 332 changes as indicated by a long dashed short dashed line a2 of FIG. 14A.

Figure 14B:
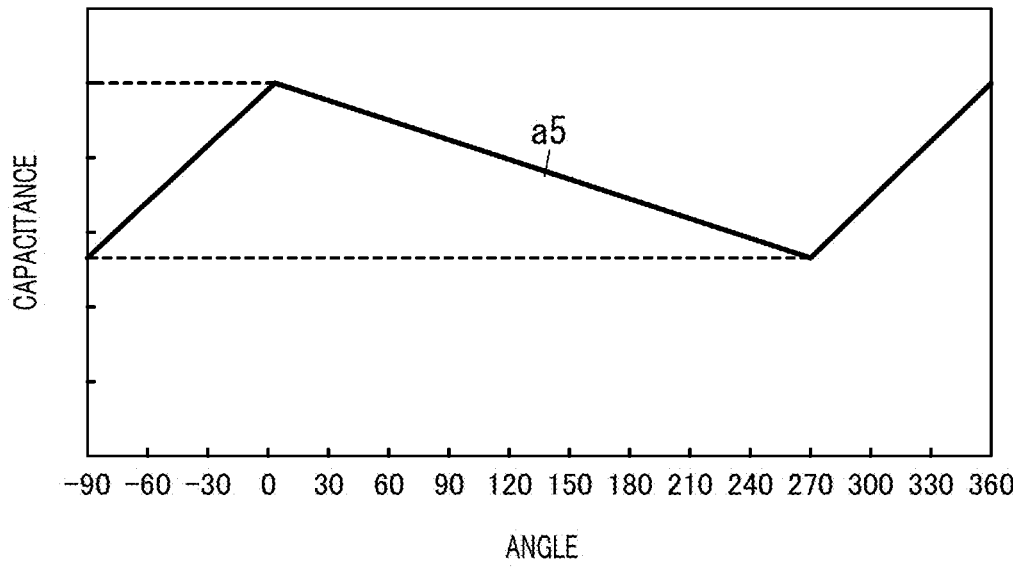
FIG. 14B is a graph of a change in capacitance of the rotary sensor of the first variation of the second embodiment.

In the rotary sensor 1B according to the first variation, capacitance C1 detected by the detection electrode part 34B changes as indicated by a solid line a5 of FIG. 14B. More specifically, in a state where the rotor 2 is located at the reference position OP1 (the angle of rotation of the rotor 2 is 0 degrees or 360 degrees), the entirety of the detection electrode part 34B overlaps the rotor 2, and the capacitance C1 is maximum. Moreover, the capacitance C1 linearly decreases in the range in which the angle of rotation of the rotor 2 is greater than or equal to 0 and less than or equal to 270 degrees, and the capacitance C1 linearly increases in the range in which the angle of rotation of the rotor 2 is greater than or equal to 270 degrees and less than or equal to 360 degrees.

Thus, in the rotary sensor 1B according to the first variation, a position where the capacitance C1 is maximum can be calibrated to the reference position OP1 (origin point position). As a result, the absolute angle of the rotor 2 with respect to a stator 3B can be easily detected. Moreover, in the rotary sensor 1B according to the first variation, it can also be detected, based on the change in the capacitance C1, that the rotary sensor 1B is operating. Moreover, in the rotary sensor 1B according to the first variation, the change rate of the capacitance C1 differs between the case where the rotor 2 clockwise rotates and the case where the rotor 2 anticlockwise rotates. Therefore, the rotational direction DR1 of the rotor 2 can also be detected based on the change rate of the capacitance C1.

Note that the width W11 of the first electrode portion 341, the width W12 of the second electrode portion 342, and the width W13 of the third electrode portion 343 may stepwise vary from the greatest to the narrowest in the order of the first electrode portion 341, the second electrode portion 342, and the third electrode portion 343.

(2.2) Second Variation

A rotary sensor according to a second variation is different from the rotary sensor 1A according to the second embodiment in that the rotary sensor according to the second variation further includes a case 36. The rotary sensor according to the second variation will be described below with reference to FIG. 15. Note that in the rotary sensor according to the second variation, components similar to those of the rotary sensor 1A according to the second embodiment are dented by the same reference signs as those of the second embodiment, and the description thereof is omitted.

Figure 15:
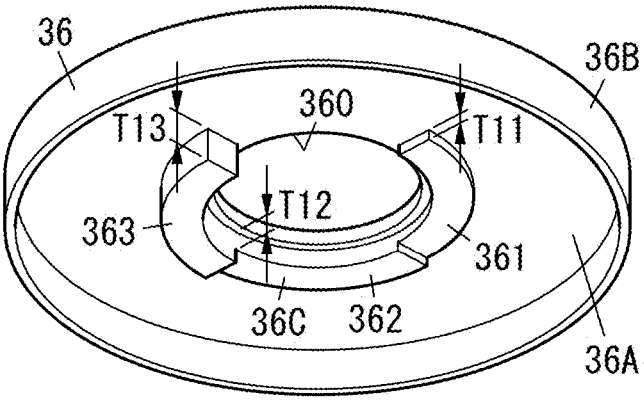
FIG. 15 is a perspective view of a case to be applied to a rotary sensor according to a second variation of the second embodiment.

As shown in FIG. 15, the rotary sensor according to the second variation further includes the case 36. The case 36 is made of, for example, an acrylonitrile-butadiene-styrene (ABS) resin or a poly butylene terephthalate (PBT) resin to have a cylindrical shape having one surface (lower surface in FIG. 15) having an opening. The case 36 includes a bottom wall 36A and a peripheral wall 36B. The bottom wall 36A has an annular shape in plan view in the one direction D1 and has a circular through hole 360 at a center part thereof. In a state where the rotary sensor 1A is attached to a rotary shaft 4, the rotary shaft 4 is inserted into the through hole 360. The peripheral wall 36B extends through the entire circumference of the bottom wall 36A along an outer edge of the bottom wall 36A. The peripheral wall 36B protrudes along a thickness direction defined with respect to the bottom wall 36A (the one direction D1).

Moreover, the bottom wall 36A has one surface (lower surface in FIG. 13) provided with a projection 36C. The projection 36C includes a first portion 361, a second portion 362, and a third portion 363. A thickness T11 of the first portion 361 is smaller (thinner) than a thickness T12 of the second portion 362. Moreover, the thickness T12 of the second portion 362 is smaller (thinner) than a thickness T13 of the third portion 363. That is, the thickness T11 of the first portion 361, the thickness T12 of the second portion 362, and the thickness T13 of the third portion 363 in the one direction D1 are small (thin) in the order of the first portion 361, the second portion 362, and the third portion 363. In sum, the thickness T11 of the first portion 361, the thickness T12 of the second portion 362, and the thickness T13 of the third portion 363 stepwise vary from the smallest to the largest in the order of the thickness T11 of the first portion 361, the thickness T12 of the second portion 362, and the thickness T13 of the third portion 363. Here, the thickness T11 of the first portion 361 is a projection amount of the first portion 361 from a lower surface of the bottom wall 36A. Further, the thickness T12 of the second portion 362 is a projection amount of the second portion 362 from the lower surface of the bottom wall 36A. Furthermore, the thickness T13 of the third portion 363 is a projection amount of the third portion 363 from the lower surface of the bottom wall 36A.

The case 36 houses at least the substrate 31 in a state where the rotor 2 is attached to the rotary shaft 4 and the entirety of the bottom wall 36A and part of the peripheral wall 36B are disposed between the rotor 2 and the stator 3A in the one direction D1. In the state where the rotor 2 is attached to the rotary shaft 4, the first portion 361 of the projection 36C overlaps the first electrode portion 341 of the detection electrode part 34A of the stator 3A in plan view in the one direction D1. Further, in the state where the rotor 2 is attached to the rotary shaft 4, the second portion 362 of the projection 36C overlaps the second electrode portion 342 of the detection electrode part 34A of the stator 3A in plan view in the one direction D1. Furthermore, in the state where the rotor 2 is attached to the rotary shaft 4, the third portion 363 of the projection 36C overlaps the third electrode portion 343 of the detection electrode part 34A of the stator 3A in plan view in the one direction D1.

In the rotary sensor according to the second variation, the first portion 361 overlaps the first electrode portion 341, the second portion 362 overlaps the second electrode portion 342, and the third portion 363 overlaps the third electrode portion 343 in the one direction D1. Therefore, the distance between the rotor 2 and the first electrode portion 341, the distance between the rotor 2 and the second electrode portion 342, and the distance between the rotor 2 and the third electrode portion 343 differ from one another. As a result, the change rate of the capacitance C1 differs between the case where the rotor 2 clockwise rotates and the case where the rotor 2 anticlockwise rotates in a similar manner to the rotary sensor 1A according to the second embodiment. Thus, in the rotary sensor according to the second variation, the reference position OP1 of the rotor 2 with respect to the stator 3A can be detected, and the rotational direction of the rotor 2 can be detected.

Note that the thickness T11 of the first portion 361, the thickness T12 of the second portion 362, and the thickness T13 of the third portion 363 may vary from the largest to the smallest in the order of the first portion 361, the second portion 362, and the third portion 363. Moreover, the thickness T11 of the first portion 361, the thickness T12 of the second portion 362, and the thickness T13 of the third portion 363 may continuously (gradually) vary from the smallest to the largest or from the largest to the smallest in the order of the first portion 361, the second portion 362, and the third portion 363.

(2.3) Third Variation

In the rotary sensor 1B according to the first variation, the width W11 of the first electrode portion 341, the width W12 of the second electrode portion 342, and the width W13 of the third electrode portion 343 stepwise vary (see FIG. 13). The first electrode portion 341, the second electrode portion 342, and the third electrode portion 343 are included in detection electrode part 34B. However, the width of the first electrode portion 341, the width of the second electrode portion 342, and the width of the third electrode portion 343 may continuously (gradually) vary. A rotary sensor 1C according to a third variation will be described below with reference to FIG. 16.

Figure 16:
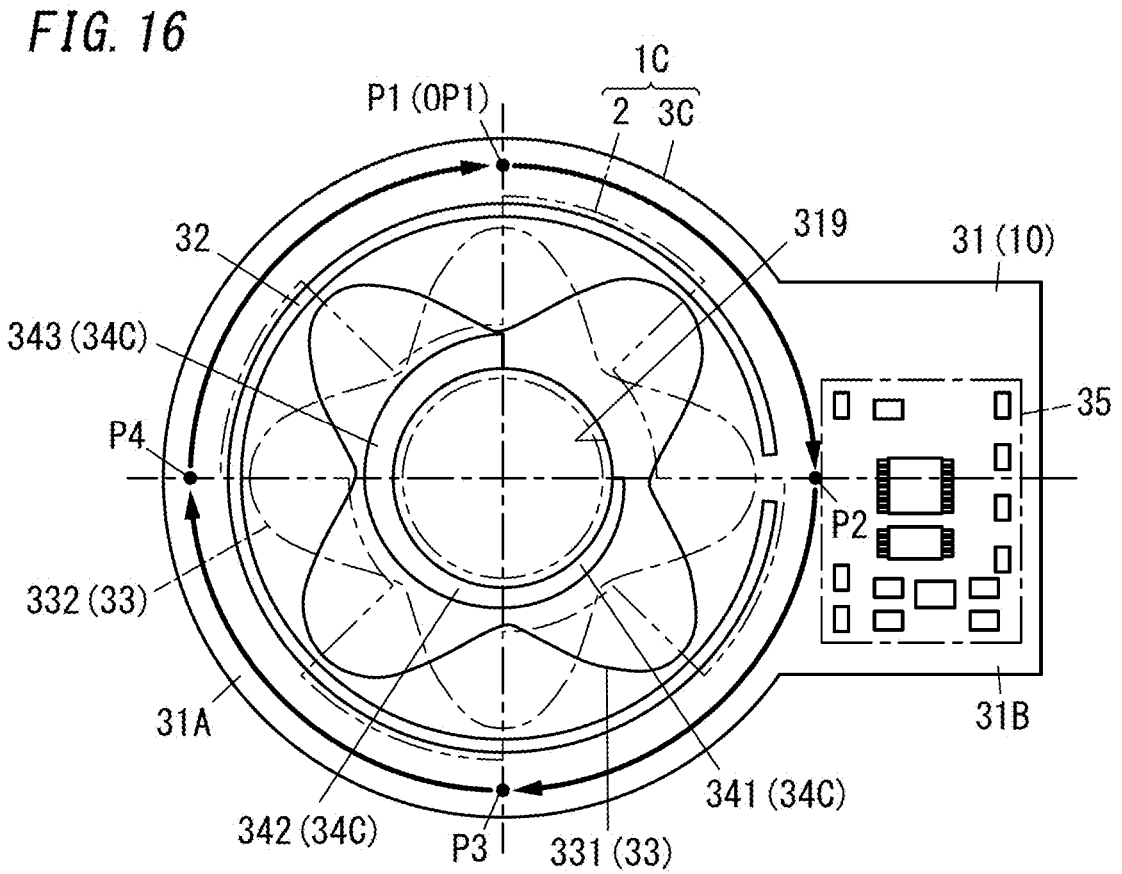
FIG. 16 is a plan view of a rotary sensor according to a third variation of the second embodiment.

As shown in FIG. 16, the rotary sensor 1C according to the third variation includes a rotor 2 and a stator 3C. The rotor 2 includes a rotor body 21 (see FIG. 3), a plurality of conductive parts 22 (see FIG. 3), and a different-thickness part 24 (see FIG. 3). The stator 3C includes a substrate 31, an excitation coil 32, a detection coil 33, and a detection electrode part 34C.

The detection electrode part 34C includes a first electrode portion 341, a second electrode portion 342, and a third electrode portion 343. In the rotary sensor 1C according to the third variation, respective widths of the first electrode portion 341, the second electrode portion 342, and the third electrode portion 343 continuously vary from the narrowest to the greatest in the order of the first electrode portion 341, the second electrode portion 342, and the third electrode portion 343 as shown in FIG. 16.

In the rotary sensor 1C according to the third variation, in a state where the rotor 2 is located at the reference position OP1 (the angle of rotation of the rotor 2 is 0 degrees or 360 degrees), the entirety of the detection electrode part 34C overlaps the rotor 2, and the capacitance C1 is maximum in a similar manner to the rotary sensor 1B according to the first variation. Thus, the rotary sensor 1C according to the third variation enables the position where the capacitance C1 is maximum to be calibrated to the reference position OP1, and as a result, the absolute angle of the rotor 2 with respect to the stator 3C can be easily detected. Further, in the rotary sensor 1C according to the third variation, it can also be detected, based on the change in the capacitance C1, that the rotary sensor 1C is operating. Furthermore, in the rotary sensor 1C according to the third variation, the change rate of the capacitance C1 differs between the case where the rotor 2 clockwise rotates and the case where the rotor 2 anticlockwise rotates, and therefore, the rotational direction DR1 of the rotor 2 can also be detected based on the change rate of the capacitance C1.

Note that the respective widths of the first electrode portion 341, the second electrode portion 342, and the third electrode portion 343 may continuously vary from the greatest to the narrowest in the order of the first electrode portion 341, the second electrode portion 342, and the third electrode portion 343.

Moreover, various configurations described in the second embodiment may be employed accordingly in combination with the various configurations (including variations) described in the first embodiment.

Third Embodiment

Figure 17:
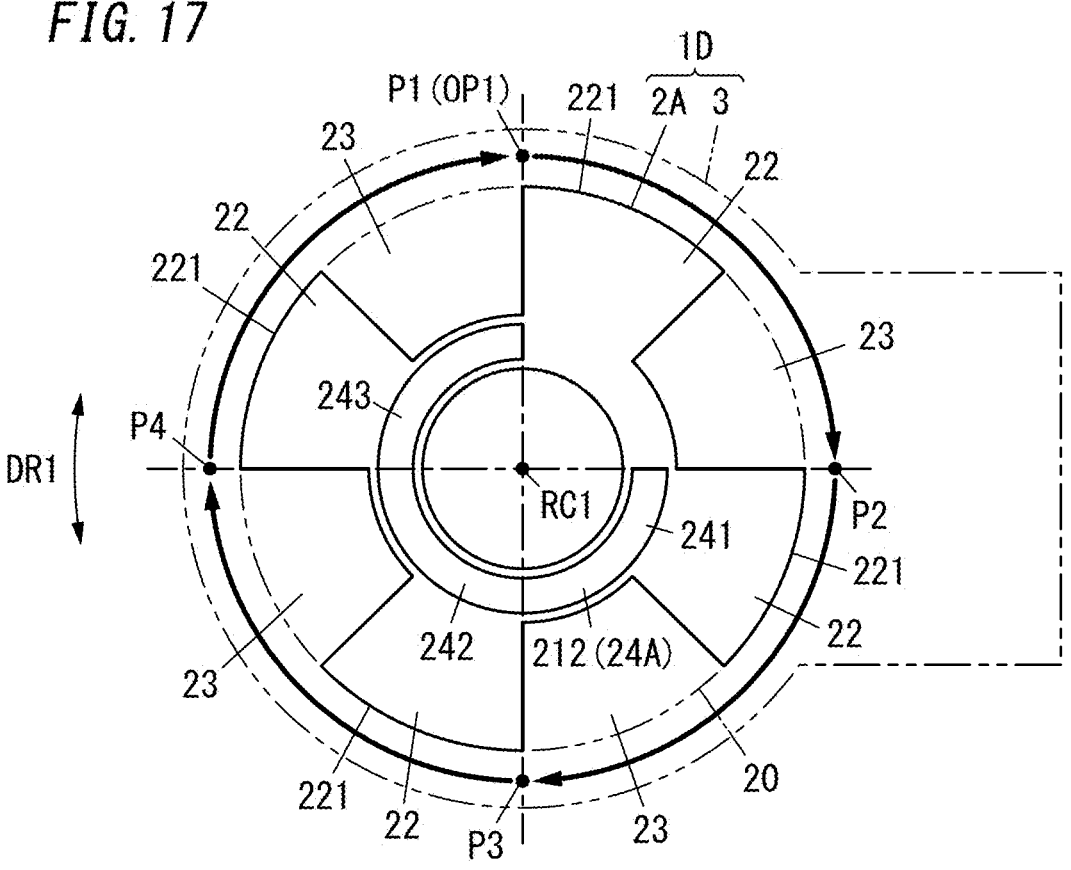
FIG. 17 is a plan view of a rotary sensor according to a third embodiment.

With reference to FIG. 17, a rotary sensor 1D according to a third embodiment will be described. The rotary sensor 1D according to the third embodiment is different from the rotary sensor 1 according to the first embodiment in that a different-thickness part 24A includes a first different thickness portion 241, a second different thickness portion 242, and a third different thickness portion 243. Note that in the rotary sensor 1D according to the third embodiment, components similar to those in the rotary sensor 1 according to the first embodiment are denoted by the same reference signs as those in the first embodiment, and the description thereof is omitted.

(1) Configuration

The rotary sensor 1D according to the third embodiment includes a rotor 2A and a stator 3. The rotor 2A includes a rotor body 21, a plurality of conductive parts 22, and a different-thickness part 24A. The stator 3 includes a substrate 31 (see FIG. 4), an excitation coil 32 (see FIG. 4), a detection coil 33 (see FIG. 4), and a detection electrode part 34 (see FIG. 4).

As shown in FIG. 17, the different-thickness part 24A includes the first different thickness portion 241, the second different thickness portion 242, and the third different thickness portion 243. The first different thickness portion 241 overlaps the detection electrode part 34 in plan view in one direction D1 when the rotor 2A has rotated 90 degrees anticlockwise in FIG. 17, from a first state where the rotor 2A is located at a reference position OP1 with respect to the stator 3, to a second state. The second different thickness portion 242 overlaps the detection electrode part 34 in plan view in the one direction D1 when the rotor 2A has rotated 90 degrees anticlockwise in FIG. 17, from the second state, to a third state. The third different thickness portion 243 overlaps the detection electrode part 34 in plan view in the one direction D1 when the rotor 2A has rotated 90 degrees anticlockwise in FIG. 17, from the third state, to a fourth state. The first different thickness portion 241, the second different thickness portion 242, and the third different thickness portion 243 are integral along a rotational direction DR1 of the rotor 2A.

In the rotary sensor 1D according to the third embodiment, in a state where the rotor 2A is located at the reference position OP1 (the angle of rotation of the rotor 2A is 0 degrees or 360 degrees), the rotor 2A and the detection electrode part 34 overlap each other in the one direction D1, and capacitance C1 detected by the detection electrode part 34 is maximum. Thus, the reference position OP1 of the rotor 2A with respect to the stator 3 can be detected based on the value of the capacitance C1, and as a result, the absolute angle of the rotor 2A with respect to the stator 3 can be easily detected. Moreover, in the rotary sensor 1D according to the third embodiment, it can also be detected, based on the change in the capacitance C1, that the rotary sensor 1D is operating.

(2) Variations

Variations of the third embodiment will be described below. Any of the variations to be described below may be combined as appropriate.

(2.1) First Variation

Figure 18:
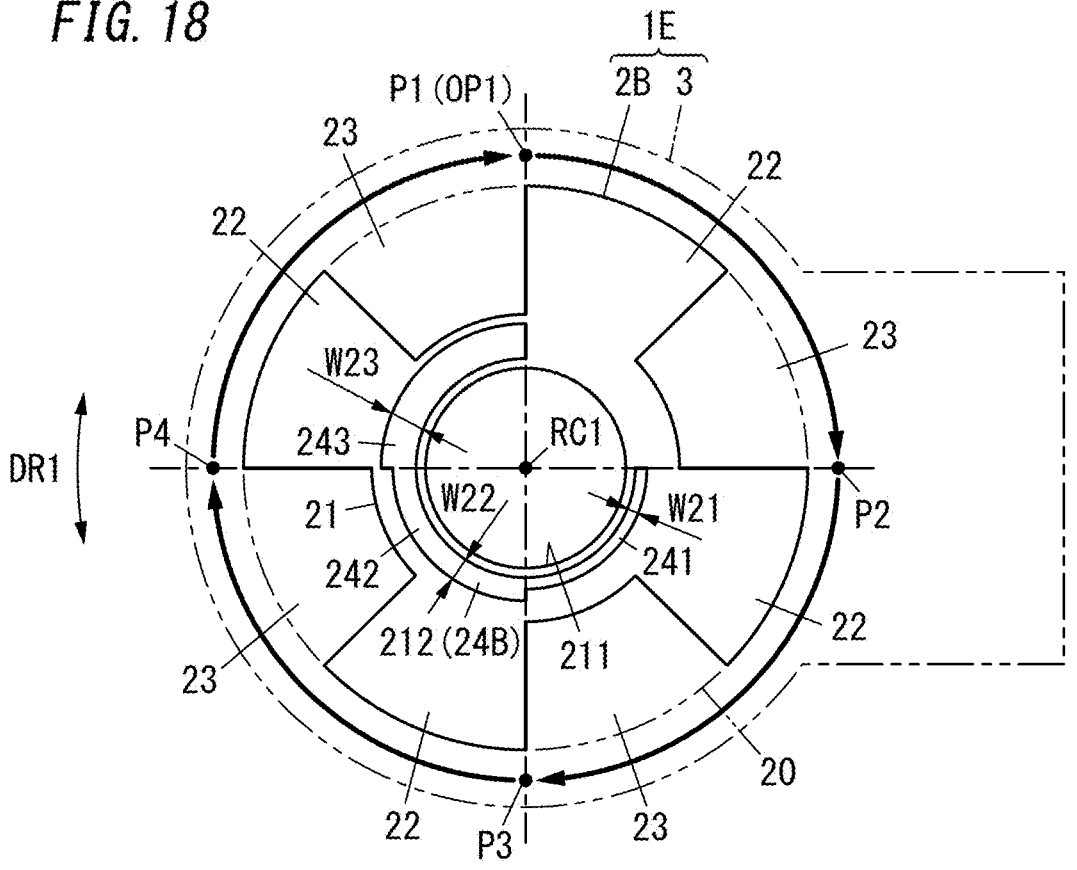
FIG. 18 is a plan view of a rotary sensor according to a first variation of the third embodiment.

In the third embodiment, the respective widths of the first different thickness portion 241, the second different thickness portion 242, and the third different thickness portion 243 in a direction orthogonal to the rotational direction DR1 of the rotor 2 (hereinafter referred to as an "orthogonal direction") are the same (see FIG. 17). In contrast, the respective widths of the first different thickness portion 241, the second different thickness portion 242, and the third different thickness portion 243 in the orthogonal direction may differ from one another as shown in FIG. 18. A rotary sensor 1E according to a first variation will be described below with reference to FIG. 18.

In the rotary sensor 1E according to the first variation, a different-thickness part 24B includes a first different thickness portion 241, a second different thickness portion 242, and a third different thickness portion 243. The first different thickness portion 241, the second different thickness portion 242, and the third different thickness portion 243 are integral along a rotational direction DR1 of the rotor 2.

In the rotary sensor 1E according to the first variation, a width W21 of the first different thickness portion 241 in the orthogonal direction is less than a width W22 of the second different thickness portion 242 in the orthogonal direction as shown in FIG. 18. Moreover, in the rotary sensor 1E according to the first variation, the width W22 of the second different thickness portion 242 in the orthogonal direction is less than a width W23 of the third different thickness portion 243 in the orthogonal direction. That is, in the rotary sensor 1E according to the first variation, the width W21 of the first different thickness portion 241, the width W22 of the second different thickness portion 242, and the width W23 of the third different thickness portion 243 are narrow in the order of the first different thickness portion 241, the second different thickness portion 242, and the third different thickness portion 243. In sum, the width W21 of the first different thickness portion 241, the width W22 of the second different thickness portion 242, and the width W23 of the third different thickness portion 243 stepwise vary.

In the rotary sensor 1E according to the first variation, in a state where a rotor 2B is located at the reference position OP1 (the angle of rotation of the rotor 2B is 0 degrees or 360 degrees), the rotor 2B and the detection electrode part 34 overlap each other in the one direction D1, and capacitance C1 detected by the detection electrode part 34 is maximum in a similar manner to the rotary sensor 1D according to the third embodiment. Therefore, the reference position OP1 of the rotor 2B with respect to the stator 3 can be detected based on the value of the capacitance C1, and as a result, the absolute angle of the rotor 2B with respect to the stator 3 can be easily detected. Moreover, in the rotary sensor 1E according to the first variation, it can also be detected, based on the change in the capacitance C1, that the rotary sensor 1E is operating. Moreover, in the rotary sensor 1E according to the first variation, the rotational direction DR1 of the rotor 2B can be detected based on the change rate of the capacitance C1.

Note that the width W21 of the first different thickness portion 241, the width W22 of the second different thickness portion 242, and the width W23 of the third different thickness portion 243 may stepwise vary from the greatest to the narrowest in the order of the first different thickness portion 241, the second different thickness portion 242, and the third different thickness portion 243.

(2.2) Second Variation

In the rotary sensor 1E according to the first variation, the width W21 of the first different thickness portion 241, the width W22 of the second different thickness portion 242, and the width W23 of the third different thickness portion 243 stepwise vary (see FIG. 18). The first different thickness portion 241, the second different thickness portion 242, and the third different thickness portion 243 are included in the different-thickness part 24B. In contrast, the respective widths of the first different thickness portion 241, the second different thickness portion 242, and the third different thickness portion 243 may continuously vary. A rotary sensor 1F according to a second variation will be described below with reference to FIG. 19.

Figure 19:
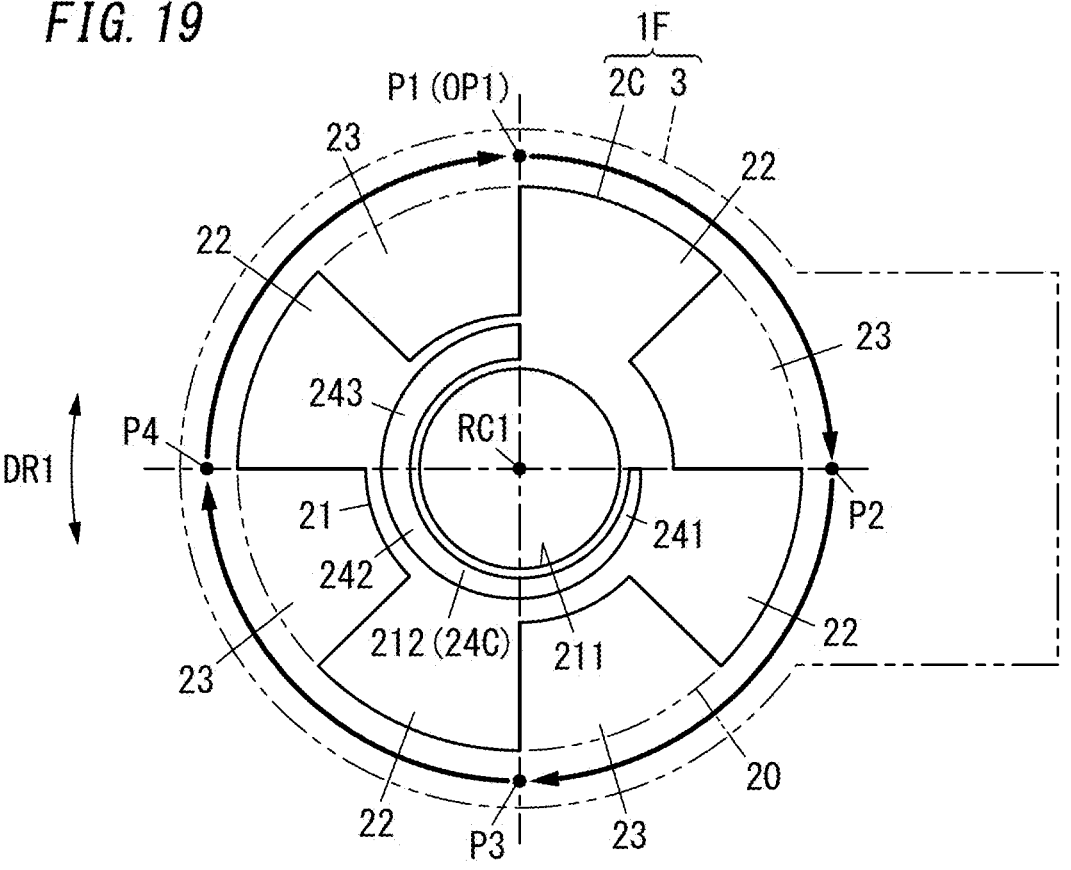
FIG. 19 is a plan view of a rotary sensor according to a second variation of the third embodiment.

As shown in FIG. 19, the rotary sensor 1F according to the second variation includes a rotor 2C and a stator 3. The rotor 2C includes a rotor body 21, a plurality of conductive parts 22, and a different-thickness part 24C. The stator 3 includes a substrate 31 (see FIG. 4), an excitation coil 32 (see FIG. 4), a detection coil 33 (see FIG. 4), and a detection electrode part 34 (see FIG. 4).

The different-thickness part 24C includes a first different thickness portion 241, a second different thickness portion 242, and a third different thickness portion 243. In the rotary sensor 1F according to the second variation, the respective widths of the first different thickness portion 241, the second different thickness portion 242, and the third different thickness portion 243 may continuously vary from the narrowest to the greatest in the order of the first different thickness portion 241, the second different thickness portion 242, and the third different thickness portion 243 as shown in FIG. 19.

In the rotary sensor 1F according to the second variation, in a state where the rotor 2C is located at the reference position OP1 (the angle of rotation of the rotor 2C is 0 degrees or 360 degrees), the rotor 2C and the detection electrode part 34 overlap each other in the one direction D1, and capacitance C1 detected by the detection electrode part 34 is maximum in a similar manner to the rotary sensor 1E according to the first variation. Thus, the reference position OP1 of the rotor 2C with respect to the stator 3 can be detected based on the value of the capacitance C1, and as a result, the absolute angle of the rotor 2C with respect to the stator 3 can be easily detected. Further, in the rotary sensor 1F according to the second variation, it can also be detected, based on the change in the capacitance C1, that the rotary sensor 1F is operating. Furthermore, in the rotary sensor 1F according to the second variation, the rotational direction DR1 of the rotor 2C can be detected based on the change rate of the capacitance C1.

Note that the respective widths of the first different thickness portion 241, the second different thickness portion 242, and the third different thickness portion 243 may continuously vary from the greatest to the narrowest in the order of the first different thickness portion 241, the second different thickness portion 242, and the third different thickness portion 243.

Moreover, various configurations described in the third embodiment may be employed accordingly in combination with various configurations (including variations) described in the first and second embodiments.

Aspects

The present specification discloses the following aspects.

A rotary sensor (1; 1A to 1F) of a first aspect is a rotary sensor (1) configured to detect an angle of rotation of a rotary object (4). The rotary sensor (1) includes a rotor (2; 2A to 2C) and a stator (3; 3A to 3C). The rotor (2; 2A to 2C) is conductive and is configured to be attached to the rotary object (4) to rotate together with the rotary object (4). The stator (3; 3A to 3C) faces the rotor (2; 2A to 2C) in one direction (D1). The rotor (2; 2A to 2C) includes a plurality of conductive parts (22) and a different-thickness part (24; 24A to 24C). The plurality of conductive parts (22) are aligned along a rotational direction (DR1) of the rotor (2; 2A to 2C). The different-thickness part (24; 24A to 24C) relatively differs in thickness in the one direction (D1). In the rotor (2; 2A to 2C), a plurality of gaps (23) are provided to separate the plurality of conductive parts (22) from each other. The stator (3; 3A to 3C) includes a substrate (31), an excitation coil (32), a detection coil (33), and a detection electrode part (34; 34A to 34C). The substrate (31) has a counter surface (310) facing the rotor (2; 2A to 2C). The excitation coil (32) is annularly arranged on the counter surface (310) of the substrate (31) such that the excitation coil (32) lies along an outer edge (20) of the rotor (2; 2A to 2C) in plan view in the one direction (D1), and the excitation coil (32) is configured to generate a magnetic field. The detection coil (33) is disposed inside the excitation coil (32) on the counter surface (310) of the substrate (31) and is configured to detect a change in the magnetic field. The detection electrode part (34; 34A to 34C) is disposed on the counter surface (310) of the substrate (31) such that the detection electrode part (34; 34A to 34C) overlaps part of a rotation trajectory (RT1) of the different-thickness part (24; 24A to 24C) at a time of rotation of the rotor (2; 2A to 2C) in plan view in the one direction (D1). The detection electrode part (34; 34A to 34C) is configured to detect capacitance (C1) generated between the detection electrode part (34; 34A to 34C) and the rotor (2; 2A to 2C).

This aspect enables an absolute angle of the rotor (2; 2A to 2C) with respect to the stator (3; 3A to 3C) to be easily detected based on a change in the capacitance (C1) detected by the detection electrode part (34; 34A to 34C).

In a rotary sensor (1; 1A to 1F) of a second aspect referring to the first aspect, each of the plurality of conductive parts (22) has a fan shape in plan view in the one direction (D1).

This aspect enables the absolute angle of the rotor (2; 2A to 2C) with respect to the stator (3; 3A to 3C) to be easily detected based on the change in the capacitance (C1) detected by the detection electrode part (34; 34A to 34C).

In a rotary sensor (1; 1A to 1F) of a third aspect referring to the first or second aspect, the different-thickness part (24; 24A to 24C) is disposed in at least one of a region (R1) between one conductive part (22) of the plurality of conductive parts (22) and a rotation center (RC1) of the rotor (2) or a region (R2) between one gap (23) of the plurality of gaps (23) and the rotation center (RC1) of the rotor (2).

This aspect enables rotation stability of the rotor (2; 2A to 2C) to be improved as compared with the case where the different-thickness part is disposed at the conductive part.

In a rotary sensor (1; 1A to 1F) of a fourth aspect referring to the third aspect, the different-thickness part (24; 24A to 24C) is disposed in the region (R1) between the one conductive part (22) and the rotation center (RC1) of the rotor (2) and the region (R2) between the one gap (23) and the rotation center (RC1) of the rotor (2).

With this aspect, a change in the capacitance (C1) is large, and as a result, the absolute angle of the rotor (2; 2A to 2C) with respect to the stator (3; 3A to 3C) is easily detected.

In a rotary sensor (1) of a fifth aspect referring to the fourth aspect, the detection electrode part (34) overlaps the different-thickness part (24) in plan view in the one direction (D1) in a state where the rotor (2) is located at a reference position (OP1) with respect to the stator (3).

This aspect enables the position of the rotor (2) where the capacitance (C1) is minimum to be calibrated to the reference position (OP1).

In a rotary sensor (1A to 1C) of a sixth aspect referring to the fourth aspect, the detection electrode part (34A to 34C) includes a first electrode portion (341), a second electrode portion (342), and a third electrode portion (343). The first electrode portion (341) is configured to overlap the different-thickness part (24) in plan view in the one direction (D1) when the rotor (2) has rotated 90 degrees, from a first state where the rotor (2) is located at a reference position (OP1) with respect to the stator (3A to 3C), to a second state. The second electrode portion (342) is configured to overlap the different-thickness part (24) in plan view in the one direction (D1) when the rotor (2) has rotated 90 degrees, from the second state, to a third. The third electrode portion (343) is configured to overlap the different-thickness part (24) in plan view in the one direction (D1) when the rotor (2) has rotated 90 degrees, from the third state, to a fourth state. The first electrode portion (341), the second electrode portion (342), and the third electrode portion (343) are integral along the rotational direction (DR1) of the rotor (2).

This aspect enables the position where the capacitance (C1) is maximum to be calibrated to the reference position (OP1).

In a rotary sensor (1B; 1C) of a seventh aspect referring to the sixth aspect, respective widths (W11, W12, W13) of the first electrode portion (341), the second electrode portion (342), and the third electrode portion (343) are narrow or great in an order of the first electrode portion (341), the second electrode portion (342), and the third electrode portion (343).

This aspect enables the rotational direction (DR1) of the rotor (2) to be detected based on the change rate of the capacitance (C1).

In a rotary sensor (1B) of an eighth aspect referring to the seventh aspect, the respective widths (W11, W12, W13) of the first electrode portion (341), the second electrode portion (342), and the third electrode portion (343) stepwise vary.

This aspect enables the rotational direction (DR1) of the rotor (2) to be detected based on the change rate of the capacitance (C1).

In a rotary sensor (1C) of a ninth aspect referring to the seventh aspect, the respective widths of the first electrode portion (341), the second electrode portion (342), and the third electrode portion (343) continuously vary.

This aspect enables the rotational direction (DR1) of the rotor (2) to be detected based on the change rate of the capacitance (C1).

In a rotary sensor (1D to 1F) of a tenth aspect referring to the fifth aspect, the different-thickness part (24A to 24C) includes a first different thickness portion (241), a second different thickness portion (242), and a third different thickness portion (243). The first different thickness portion (241) is configured to overlap the detection electrode part (34) in plan view in the one direction (D1) when the rotor (2A to 2C) has rotated 90 degrees, from a first state where the rotor (2A to 2C) is located at the reference position (OP1) with respect to the stator (3), to a second state. The second different thickness portion (242) is configured to overlap the detection electrode part (34) in plan view in the one direction (D1) when the rotor (2A to 2C) has rotated 90 degrees, from the second state, to a third state. The third different thickness portion (243) is configured to overlap the detection electrode part (34) in plan view in the one direction (D1) when the rotor (2A to 2C) has rotated 90 degrees, from the third state, to a fourth state. The first different thickness portion (241), the second different thickness portion (242), and the third different thickness portion (243) are integral along the rotational direction (DR1) of the rotor (2A to 2C).

This aspect enables the absolute angle of the rotor (2A to 2C) with respect to the stator (3) and that the rotary object (4) is rotating to be detected.

In a rotary sensor (1E, 1F) of an eleventh aspect referring to the tenth aspect, respective widths (W21, W22, W23) of the first different thickness portion (241), the second different thickness portion (242), and the third different thickness portion (243) are narrow or great in an order of the first different thickness portion (241), the second different thickness portion (242), and the third different thickness portion (243).

This aspect enables the rotational direction (DR1) of the rotor (2B, 2C) to be detected based on the change rate of the capacitance (C1).

In a rotary sensor (1E) of a twelfth aspect referring to the eleventh aspect, the respective widths (W21, W22, W23) of the first different thickness portion (241), the second different thickness portion (242), and the third different thickness portion (243) stepwise vary.

This aspect enables the rotational direction (DR1) of the rotor (2B) to be detected based on the change rate of the capacitance (C1).

In a rotary sensor (1F) of a thirteenth aspect referring to the eleventh aspect, the respective widths of the first different thickness portion (241), the second different thickness portion (242), and the third different thickness portion (243) continuously vary.

This aspect enables the rotational direction (DR1) of the rotor (2C) to be detected based on the change rate of the capacitance (C1).

In a rotary sensor (1A) of a fourteenth aspect referring to the sixth aspect further includes a case (36). The case (36) is made of a resin, is partially disposed between the rotor (2) and the stator (3A) in the one direction (D1), and houses at least the substrate (31). The case (36) includes a first portion (361), a second portion (362), and a third portion (363). The first portion (361) overlaps the first electrode portion (341) in plan view in the one direction (D1). The second portion (362) overlaps the second electrode portion (342) in plan view in the one direction (D1). The third portion (363) overlaps the third electrode portion (343) in plan view in the one direction (D1). Respective thicknesses (T11, T12, T13) of the first portion (361), the second portion (362), and the third portion (363) in the one direction (D1) are small or large in an order of the first portion (361), the second portion (362), and the third portion (363).

This aspect enables the rotational direction (DR1) of the rotor (2) to be detected based on the change rate of the capacitance (C1).

In a rotary sensor (1A) of a fifteenth aspect referring to the fourteenth aspect, the respective thicknesses (T11, T12, T13) of the first portion (361), the second portion (362), and the third portion (363) stepwise vary.

This aspect enables the rotational direction (DR1) of the rotor (2) to be detected based on the change rate of the capacitance (C1).

In a rotary sensor (1A) of the sixteenth aspect referring to the fourteenth aspect, the respective thicknesses of the first portion (361), the second portion (362), and the third portion (363) continuously vary.

This aspect enables the rotational direction (DR1) of the rotor (2) to be detected based on the change rate of the capacitance (C1).

In a rotary sensor (1) of a seventeenth aspect referring to any one of the first to sixteenth aspects, the different-thickness part (24) is a recess (213) in a counter surface (210) of the rotor (2), the counter surface (210) facing the stator (3).

This aspect enables the different-thickness part (24) to be easily formed.

In a rotary sensor (1) of an eighteenth aspect referring to any one of the first to sixteenth aspects, the different-thickness part (24) is a through hole (212) penetrating through the rotor (2) in the one direction (D1).

This aspect enables the different-thickness part (24) to be easily formed.

A sensor substrate (10) of a nineteenth aspect is configured to be applied to the substrate (31) of the rotary sensor (1) of any one of the first to eighteenth aspects.

This aspect enables the absolute angle of the rotor (2) with respect to the stator (3) to be detected based on a change in the capacitance (C1) detected by the detection electrode part (34).

The configurations of the second to eighteenth aspects are not configurations essential for the rotary sensor (1; 1A to 1F) and may accordingly be omitted.

REFERENCE SIGNS LIST

1, 1A to 1F Rotary Sensor
2, 2A to 2C Rotor
3, 3A to 3C Stator
4 Rotary Object
10 Sensor Substrate
20 Outer Edge
22 Conductive Part
23 Gap
24, 24A to 24C Different-thickness part
31 Substrate
32 Excitation Coil
33 Detection Coil
34, 34A to 34C Detection Electrode Part
36 Case
210 Counter Surface
212 Through Hole
213 Recess
241 First Different Thickness Portion
242 Second Different Thickness Portion
243 Third Different Thickness Portion
310 Counter Surface
341 First Electrode Portion
342 Second Electrode Portion
343 Third Electrode Portion
361 First Portion
362 Second Portion
363 Third Portion
C1 Capacitance
D1 One Direction
DR1 Rotational Direction
OP1 Reference Position
R1 First Region (Region)
R2 Second Region (Region)
RC1 Rotation Center
RT1 Rotation Trajectory
T11, T12, T13 Thickness
W11, W12, W13, W21, W22, W23 Width

The invention claimed is:

1. A rotary sensor configured to detect an angle of rotation of a rotary object, the rotary sensor comprising:
   a rotor being conductive and configured to be attached to the rotary object to rotate together with the rotary object; and
   a stator facing the rotor in one direction,
   the rotor including
      a plurality of conductive parts aligned along a rotational direction of the rotor and
      a different-thickness part relatively differing in thickness in the one direction,
   the rotor having a plurality of gaps provided to separate the plurality of conductive parts from each other,
   the stator including
      a substrate having a counter surface facing the rotor,
      an excitation coil annularly arranged on the counter surface of the substrate such that the excitation coil lies along an outer edge of the rotor in plan view in the one direction, the excitation coil being configured to generate a magnetic field,
      a detection coil disposed inside the excitation coil on the counter surface of the substrate and configured to detect a change in the magnetic field, and

a detection electrode part disposed on the counter surface of the substrate such that the detection electrode part overlaps part of a rotation trajectory of the different-thickness part at a time of rotation of the rotor in plan view in the one direction, the detection electrode part being configured to detect capacitance generated between the detection electrode part and the rotor.

2. The rotary sensor of claim 1, wherein
each of the plurality of conductive parts has a fan shape in plan view in the one direction.

3. The rotary sensor of claim 1, wherein
the different-thickness part is disposed in at least one of a region between one conductive part of the plurality of conductive parts and a rotation center of the rotor or a region between one gap of the plurality of gaps and the rotation center of the rotor.

4. The rotary sensor of claim 3, wherein
the different-thickness part is disposed in the region between the one conductive part and the rotation center of the rotor and the region between the one gap and the rotation center of the rotor.

5. The rotary sensor of claim 4, wherein
the detection electrode part overlaps the different-thickness part in plan view in the one direction in a state where the rotor is located at a reference position with respect to the stator.

6. The rotary sensor of claim 5, wherein
the different-thickness part includes
   a first different thickness portion configured to overlap the detection electrode part in plan view in the one direction when the rotor has rotated 90 degrees, from a first state where the rotor is located at the reference position with respect to the stator, to a second state,
   a second different thickness portion configured to overlap the detection electrode part in plan view in the one direction when the rotor has rotated 90 degrees, from the second state, to a third, and
   a third different thickness portion configured to overlap the detection electrode part in plan view in the one direction when the rotor has rotated 90 degrees, from the third state, to a fourth state, and
the first different thickness portion, the second different thickness portion, and the third different thickness portion are integral along the rotational direction of the rotor.

7. The rotary sensor of claim 6, wherein
respective widths of the first different thickness portion, the second different thickness portion, and the third different thickness portion are narrow or great in an order of the first different thickness portion, the second different thickness portion, and the third different thickness portion.

8. The rotary sensor of claim 7, wherein
the respective widths of the first different thickness portion, the second different thickness portion, and the third different thickness portion stepwise vary.

9. The rotary sensor of claim 7, wherein
the respective widths of the first different thickness portion, the second different thickness portion, and the third different thickness portion continuously vary.

10. The rotary sensor claim 4, wherein
the detection electrode part includes
   a first electrode portion configured to overlap the different-thickness part in plan view in the one direction when the rotor has rotated 90 degrees, from a first state where the rotor is located at a reference position with respect to the stator, a second state, a second electrode portion configured to overlap the different-thickness part in plan view in the one direction when the rotor has rotated 90 degrees, from the second state, to a third state, and a third electrode portion configured to overlap the different-thickness part in plan view in the one direction when the rotor has rotated 90 degrees, from the third state, to a fourth state, and the first electrode portion, the second electrode portion, and the third electrode portion are integral along the rotational direction of the rotor.

11. The rotary sensor of claim 10, wherein respective widths of the first electrode portion, the second electrode portion, and the third electrode portion are great or narrow in an order of the first electrode portion, the second electrode portion, and the third electrode portion.

12. The rotary sensor of claim 11, wherein the respective widths of the first electrode portion, the second electrode portion, and the third electrode portion stepwise vary.

13. The rotary sensor of claim 11, wherein the respective widths of the first electrode portion, the second electrode portion, and the third electrode portion continuously vary.

14. The rotary sensor of claim 10, further comprising a case made of a resin, partially disposed between the rotor and the stator in the one direction, and housing at least the substrate, wherein the case includes a first portion overlapping the first electrode portion in plan view in the one direction, a second portion overlapping the second electrode portion in plan view in the one direction, and a third portion overlapping the third electrode portion in plan view in the one direction, and respective thicknesses of the first portion, the second portion, and the third portion in the one direction are small or large in an order of the first portion, the second portion, and the third portion.

15. The rotary sensor of claim 14, wherein the respective thicknesses of the first portion, the second portion, and the third portion stepwise vary.

16. The rotary sensor claim 14, wherein the respective thicknesses of the first portion, the second portion, and the third portion continuously vary.

17. The rotary sensor of claim 1, wherein the different-thickness part is a recess in a counter surface of the rotor, the counter surface facing the stator.

18. The rotary sensor of claim 1, wherein the different-thickness part is a through hole penetrating through the rotor in the one direction.

19. A sensor substrate configured to be applied to the substrate of the rotary sensor of claim 1.

* * * * *